(12) United States Patent
Horie

(10) Patent No.: US 11,397,346 B2
(45) Date of Patent: Jul. 26, 2022

(54) DISPLAY APPARATUS

(71) Applicant: Japan Display Inc., Tokyo (JP)

(72) Inventor: Shinji Horie, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 17/319,290

(22) Filed: May 13, 2021

(65) Prior Publication Data

US 2021/0263363 A1 Aug. 26, 2021

Related U.S. Application Data

(63) Continuation of application No. PCT/JP2019/040202, filed on Oct. 11, 2019.

(30) Foreign Application Priority Data

Nov. 16, 2018 (JP) .............................. JP2018-215879

(51) Int. Cl.
*G02F 1/1339* (2006.01)
*G02F 1/1333* (2006.01)
(Continued)

(52) U.S. Cl.
CPC ........ *G02F 1/13338* (2013.01); *G02F 1/1339* (2013.01); *G02F 1/13439* (2013.01);
(Continued)

(58) Field of Classification Search
CPC ........... G02F 1/13338; G02F 1/133528; G02F 1/1339; G02F 1/134309; G02F 1/13439; G06F 3/0412; G06F 3/044
See application file for complete search history.

(56) References Cited

U.S. PATENT DOCUMENTS 9,143,668 B2 9/2015 Mathew et al.
9,851,605 B2 12/2017 Watanabe et al.
(Continued)

FOREIGN PATENT DOCUMENTS

JP 2006-343728 A 12/2006
JP 2012-098726 A 5/2012
(Continued)

OTHER PUBLICATIONS

International Search Report dated Dec. 17, 2019 in PCT/JP2019/040202 filed on Oct. 11, 2019, 3 pages.
(Continued)

*Primary Examiner* — James A Dudek
(74) *Attorney, Agent, or Firm* — Oblon, McClelland, Maier & Neustadt, L.L.P.

(57) ABSTRACT

A display apparatus includes: a first substrate and a second substrate arranged so as to face each other; a display region included in each of the first substrate and the second substrate; a transparent region formed inside the display region in a planar view; a frame region formed between the display region and the transparent region so as to surround the transparent region along an outer edge of the transparent region in a planar view; a polarizer formed in either the first substrate or the second substrate and having an opening overlapping the transparent region; a first transparent conductive film formed in a first conductive layer between the first substrate and the second substrate; and a second transparent conductive film formed in a second conductive layer between the first conductive layer and the second substrate. The second transparent conductive film is in the frame region in a planar view.

11 Claims, 17 Drawing Sheets

Figure 1:
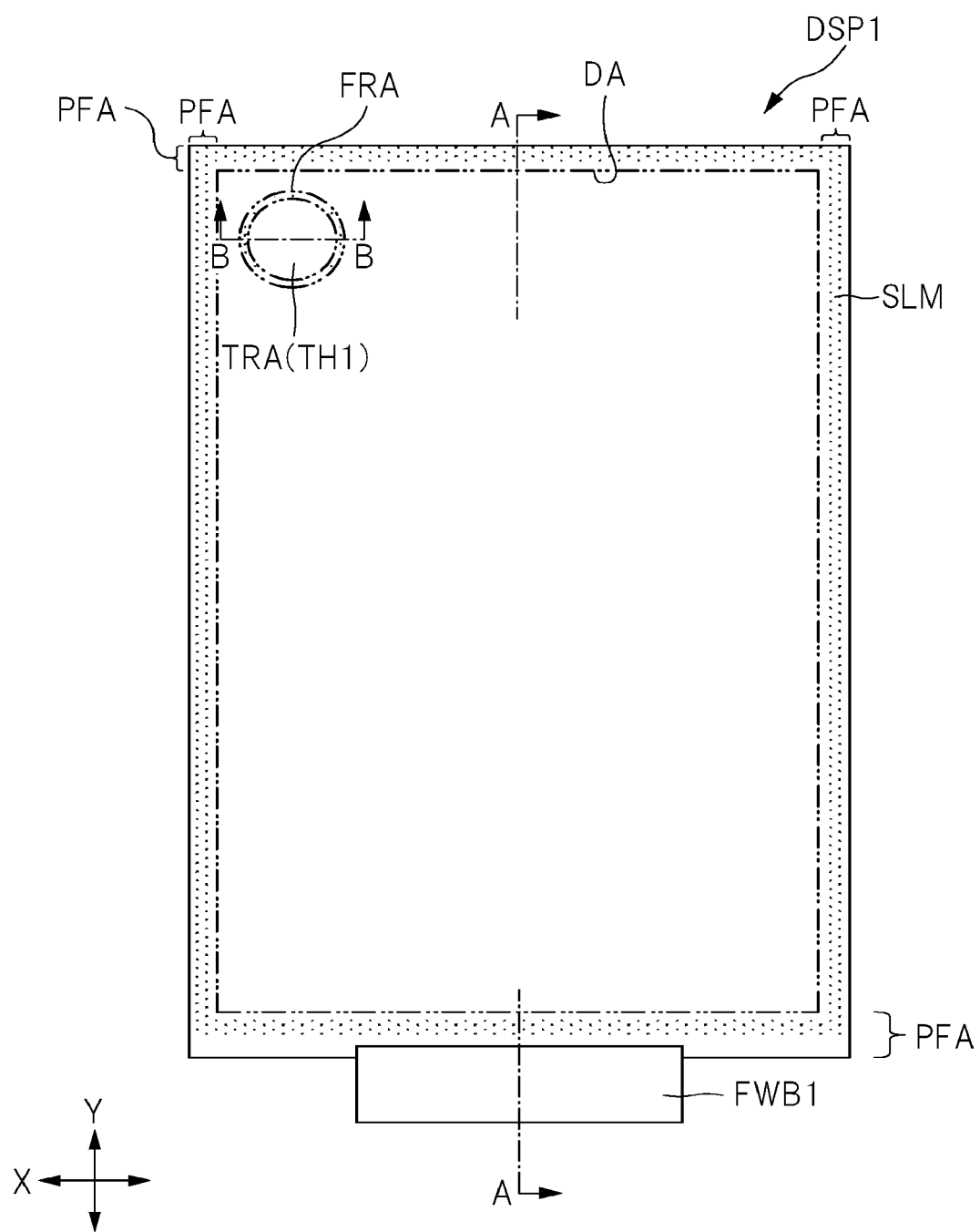

(51) Int. Cl.
  *G02F 1/1335* (2006.01)
  *G02F 1/1343* (2006.01)
  *G06F 3/041* (2006.01)
  *G06F 3/044* (2006.01)

(52) U.S. Cl.
  CPC .. *G02F 1/133528* (2013.01); *G02F 1/134309* (2013.01); *G06F 3/044* (2013.01); *G06F 3/0412* (2013.01)

(56) References Cited

U.S. PATENT DOCUMENTS

| | | |
|---|---|---|
| 10,009,525 B2 | 6/2018 | Mathew et al. |
| 10,962,853 B1 | 3/2021 | Aichi |
| 2006/0262253 A1 | 11/2006 | Teramoto et al. |
| 2017/0123452 A1 | 5/2017 | Evans, V et al. |
| 2020/0236259 A1* | 7/2020 | Nakamura ........ G02F 1/133345 |
| 2021/0109387 A1 | 4/2021 | Aichi |

FOREIGN PATENT DOCUMENTS

| | | |
|---|---|---|
| WO | WO 2015/029704 A1 | 3/2015 |
| WO | WO 2018/190214 A1 | 10/2018 |
| WO | WO 2018/216545 A1 | 11/2018 |

OTHER PUBLICATIONS

Office Action dated Feb. 25, 2022, in Indian Patent Application No. 202117024232, w/English Translation.

\* cited by examiner

DISPLAY APPARATUS

CROSS REFERENCES TO RELATED APPLICATIONS

The present application is a continuation of International Application No. PCT/JP2019/040202 filed on Oct. 11, 2019, and claims priority to Japanese Patent Application No. 2018-215879 filed on Nov. 16, 2018, the disclosure of which is incorporated herein by reference.

TECHNICAL FIELD

The present invention relates to a technique of a display apparatus, and relates to a technique effectively applied to a display apparatus having a transparent region not overlapping a pixel in a display region.

BACKGROUND ART

Patent Document 1 (Japanese Patent Application Laid-Open Publication No. 2006-343728) describes a display apparatus having a light-blocking unit that is arranged between an image display unit and a transparent display unit. Patent Document 2 (U.S. Patent Application Laid-Open Publication No. 2017/0123452) describes a display apparatus having a transparent region that is arranged at a position overlapping a camera.

RELATED ART DOCUMENTS

Patent Documents

Patent Document 1: Japanese Patent Application Laid-Open Publication No. 2006-343728
Patent Document 2: U.S. Patent Application Laid-Open Publication No. 2017/0123452

SUMMARY OF THE INVENTION

Problems to be Solved by the Invention

For display apparatuses, it is necessary to increase an occupancy of an effective display region by reducing an area of a non-display region inside a display region as small as possible. As part of working for achieving this necessity, the inventors of the present application have studied a technique for, for example, increasing an area of the display region reaching a position surrounding a region where a component such as a camera is arranged. In a planar view, in order to arrange a visible-light transmittable transparent region where the component such as the camera is arranged, inside the display region, it is necessary to suppress change in electrical characteristics of the display region around the transparent region due to the arrangement of the transparent region.

A purpose of the present invention is to provide a technique capable of improving a performance of a display apparatus.

Means for Solving the Problems

A display apparatus according to one aspect of the present invention includes: a first substrate and a second substrate arranged so as to face each other; a display region included in each of the first substrate and the second substrate; a transparent region formed inside the display region in a planar view; a frame region formed between the display region and the transparent region so as to surround the transparent region along an outer edge of the transparent region in a planar view; a polarizer formed in either the first substrate or the second substrate and having an opening overlapping the transparent region; a first transparent conductive film formed in a first conductive layer between the first substrate and the second substrate; and a second transparent conductive film formed in a second conductive layer between the first conductive layer and the second substrate. In a planar view, the frame region includes the first transparent conductive film or the second transparent conductive film.

BRIEF DESCRIPTIONS OF THE DRAWINGS

Figure 2:
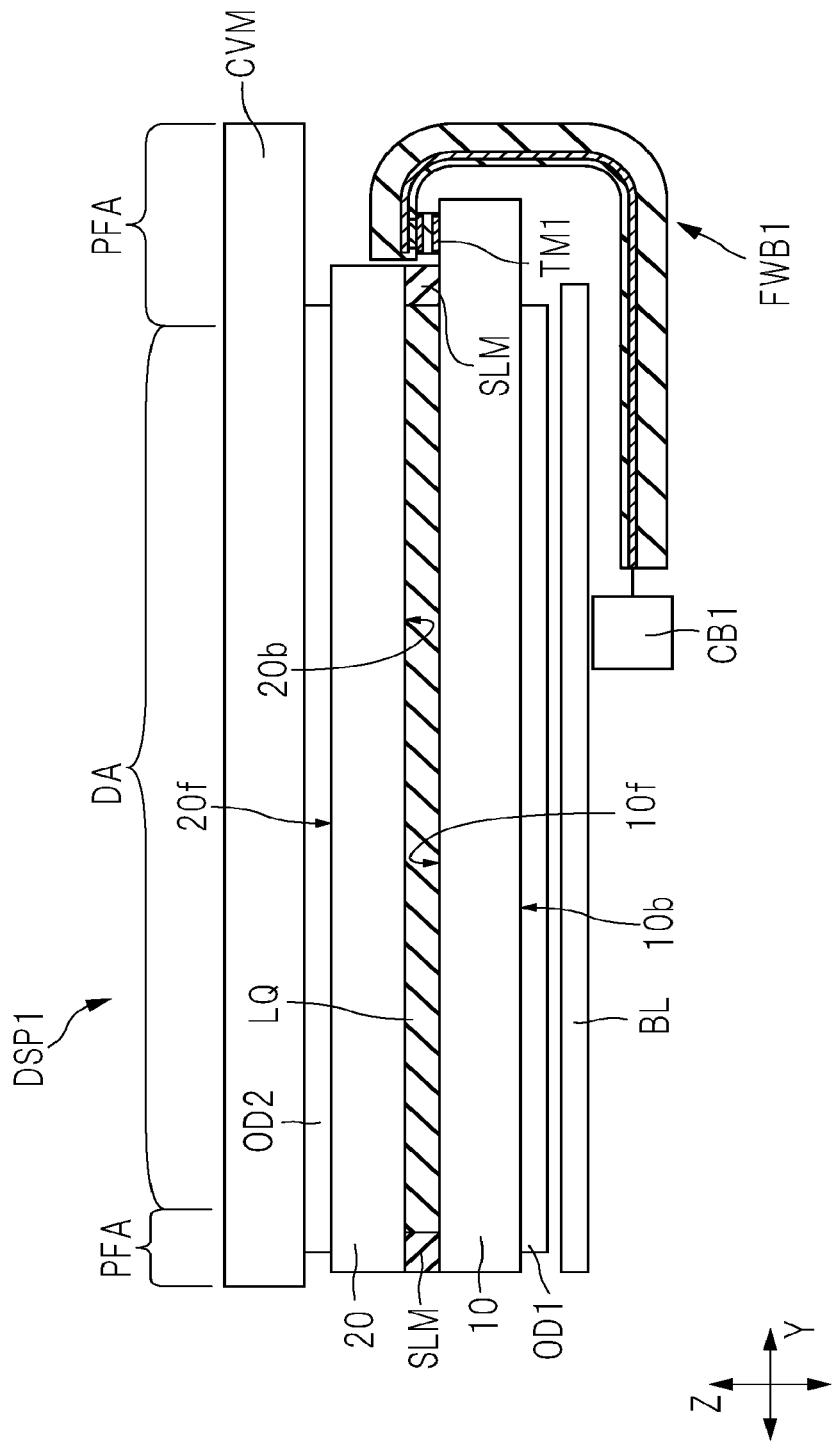
Figure 3:
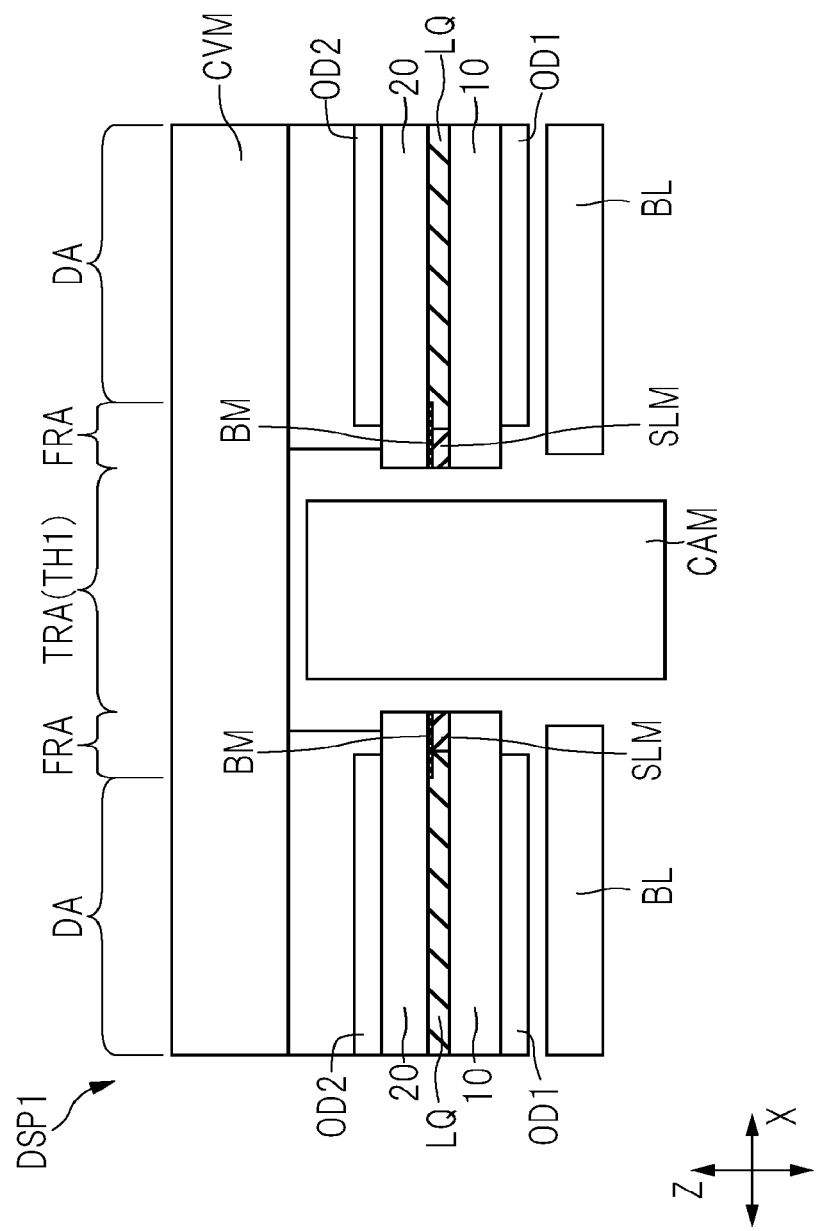
Figure 4:
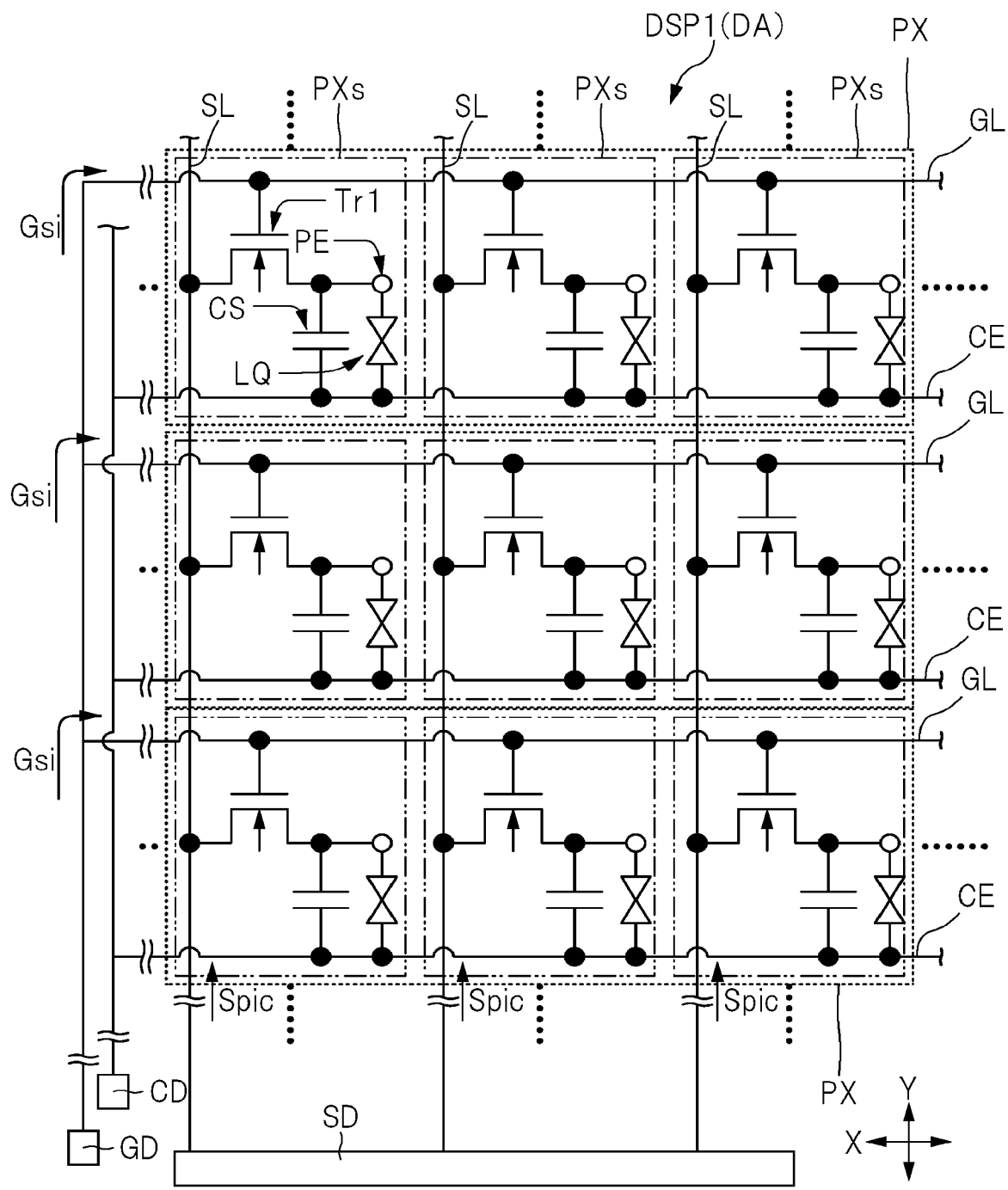
Figure 5:
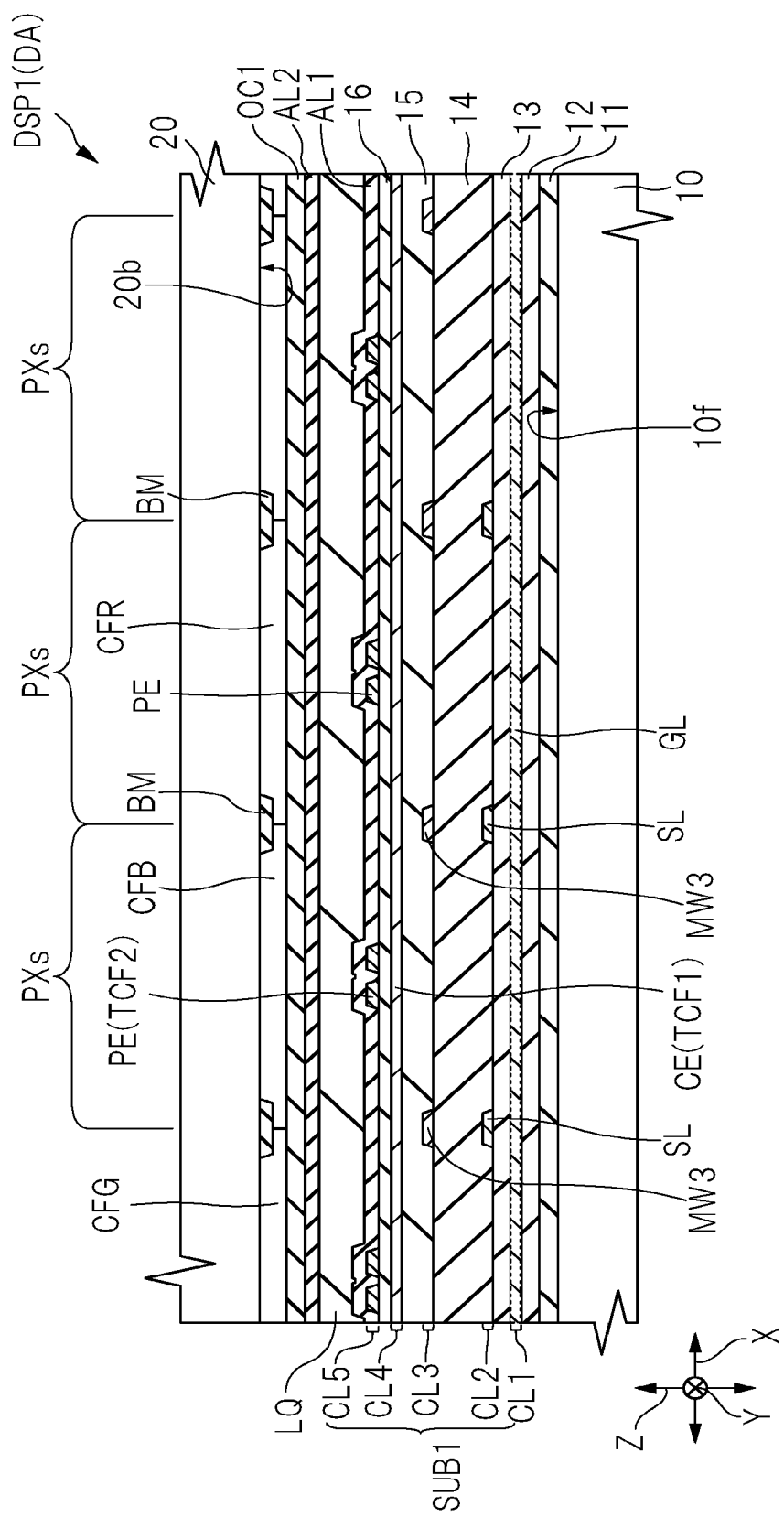
Figure 6:
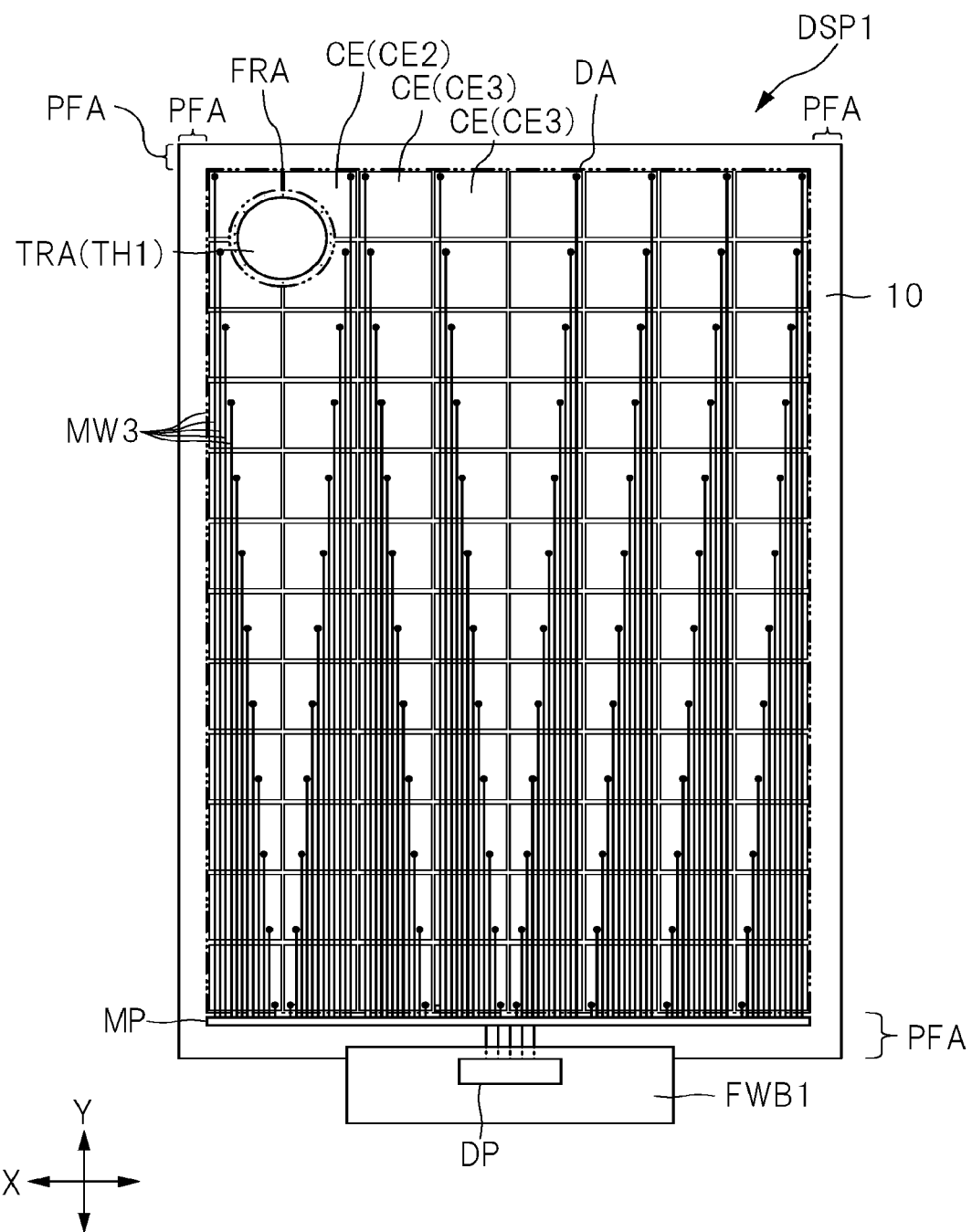
Figure 7:
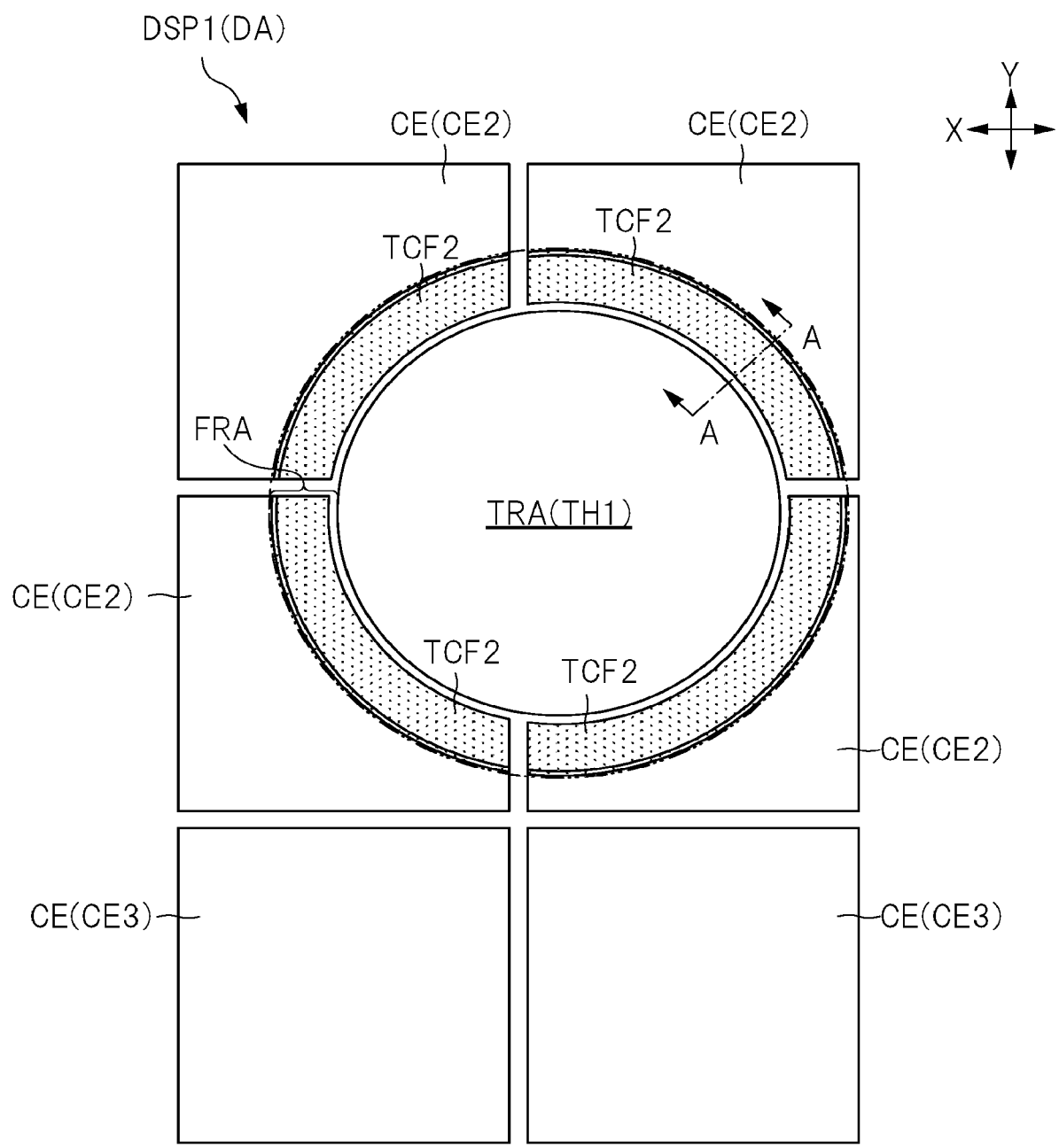
Figure 8:
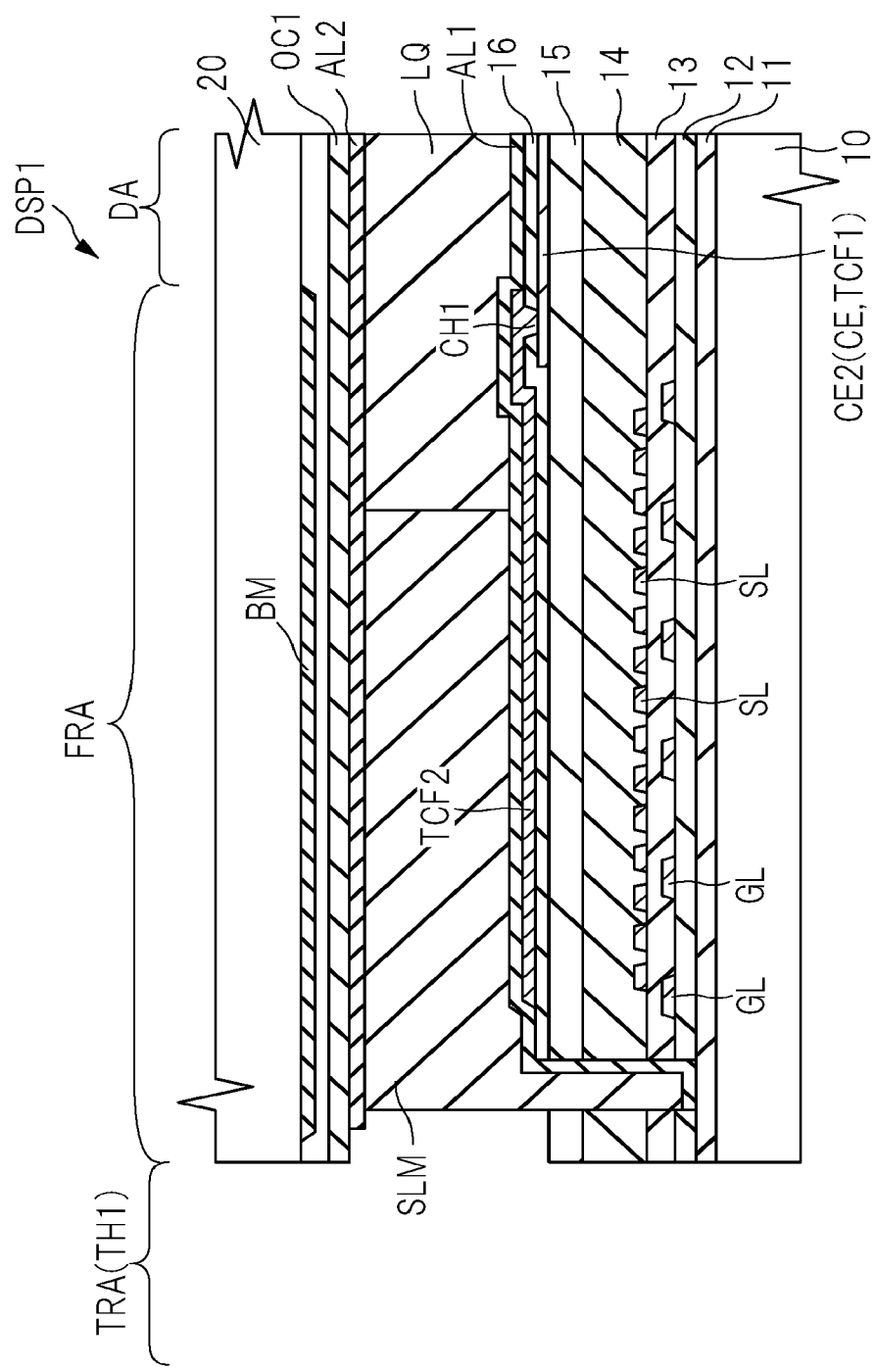
Figure 9:
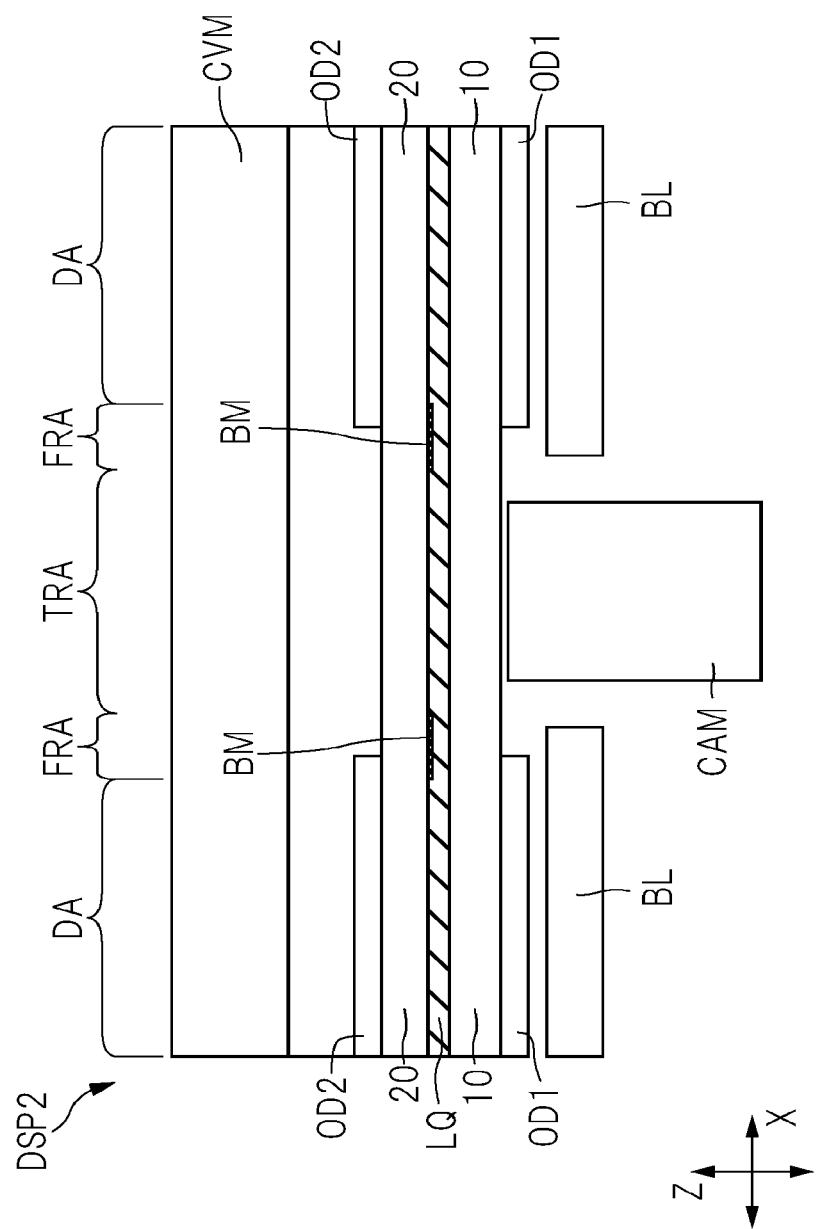
Figure 10:
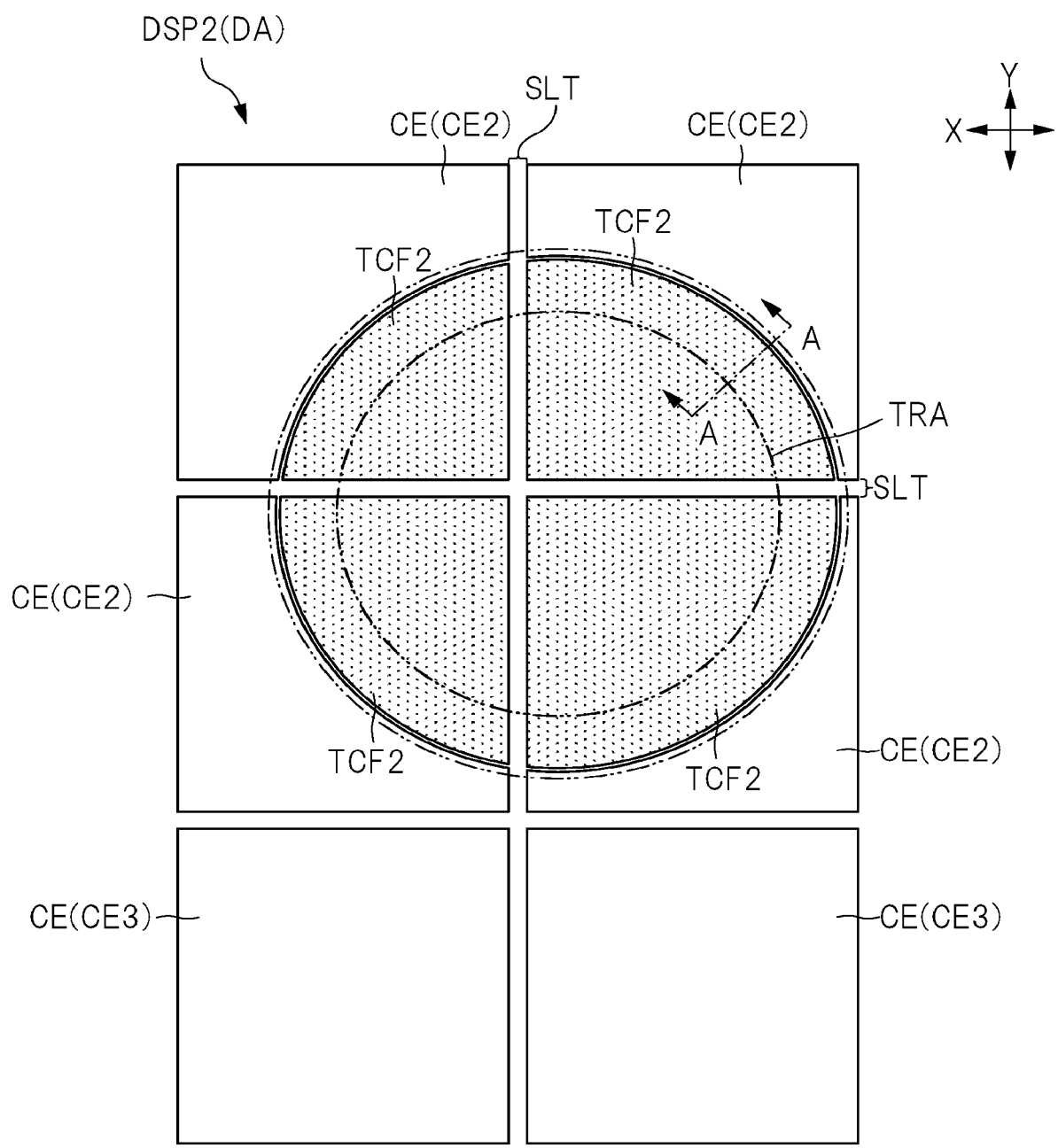
Figure 11:
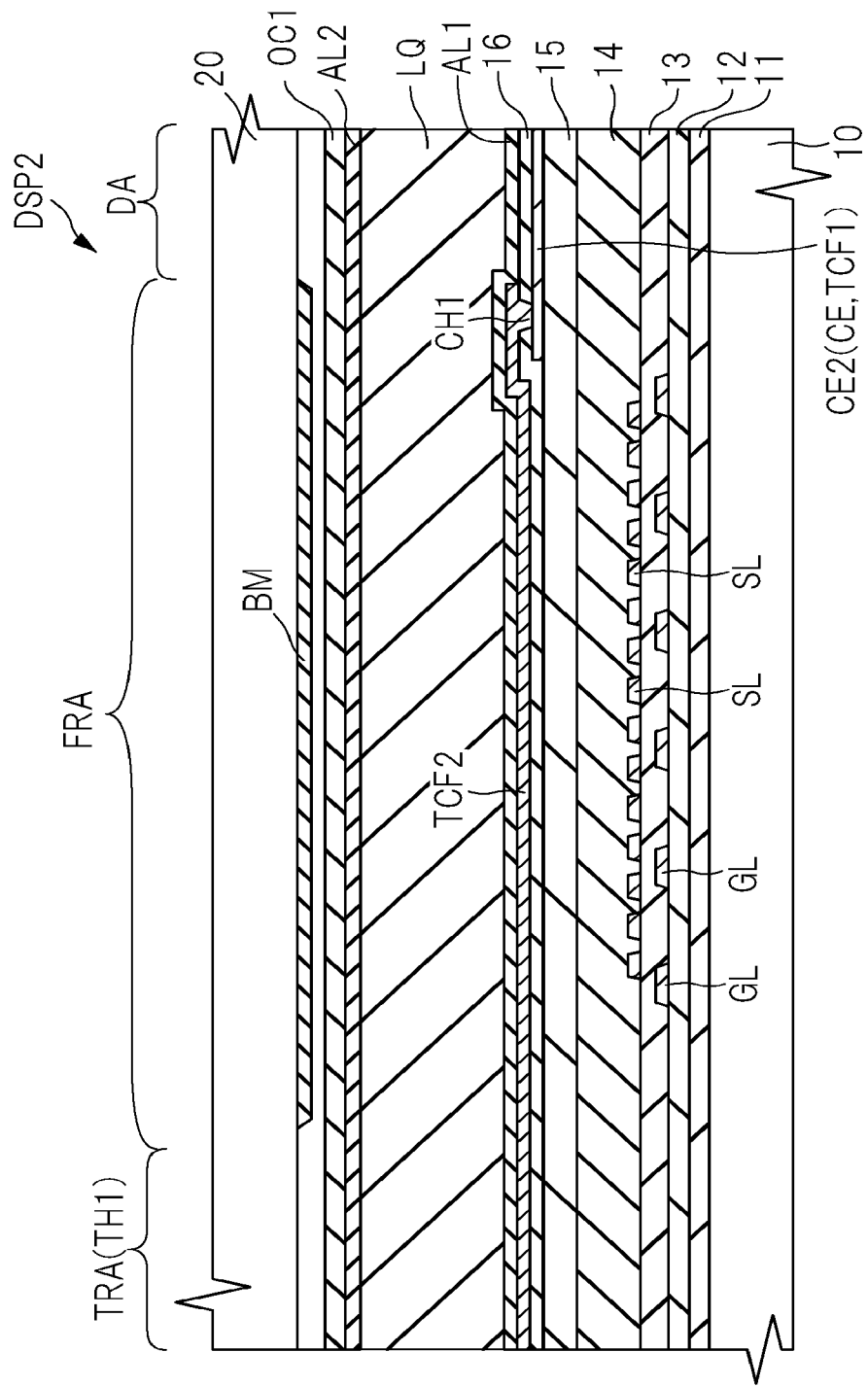
Figure 12:
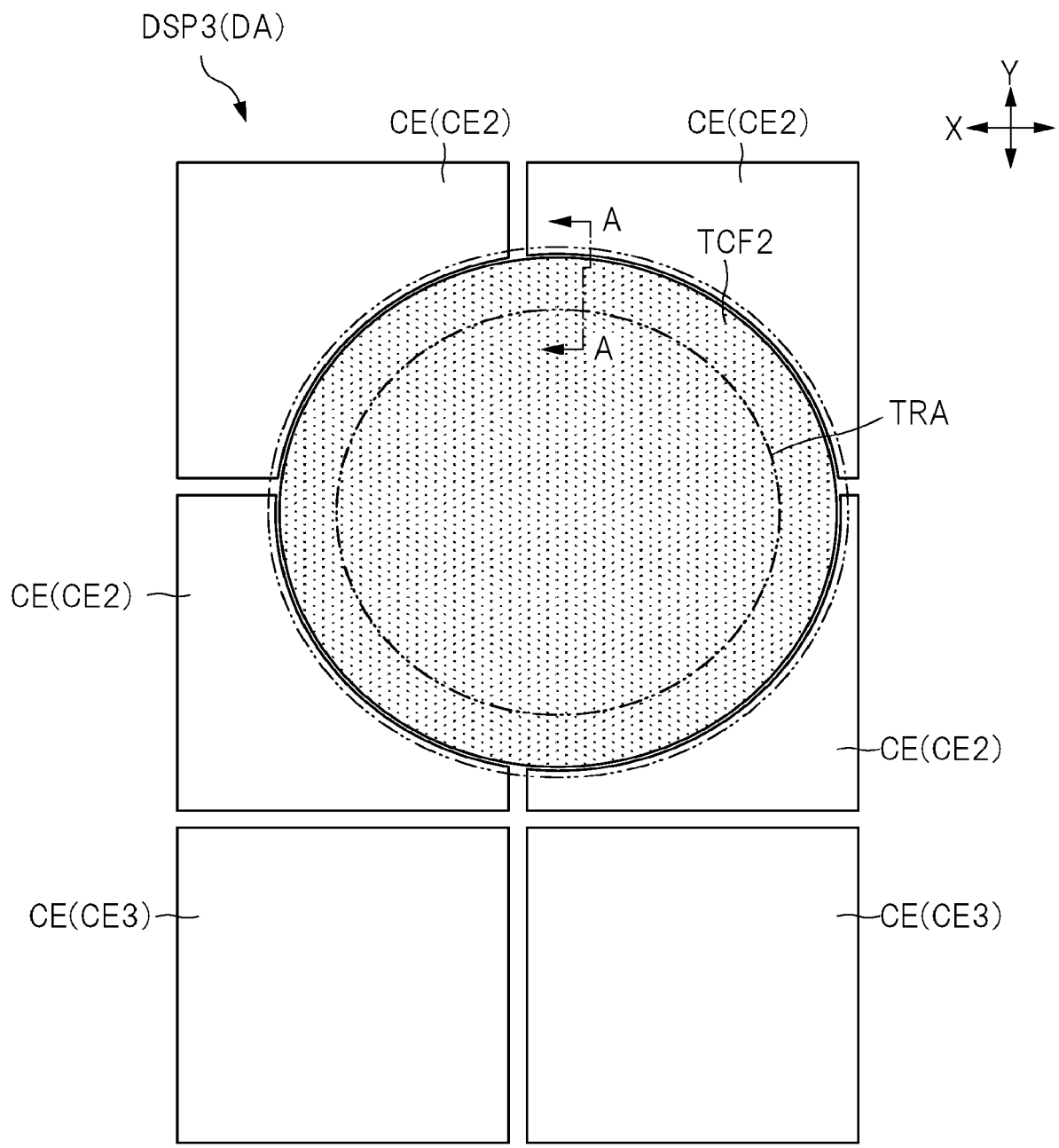
Figure 13:
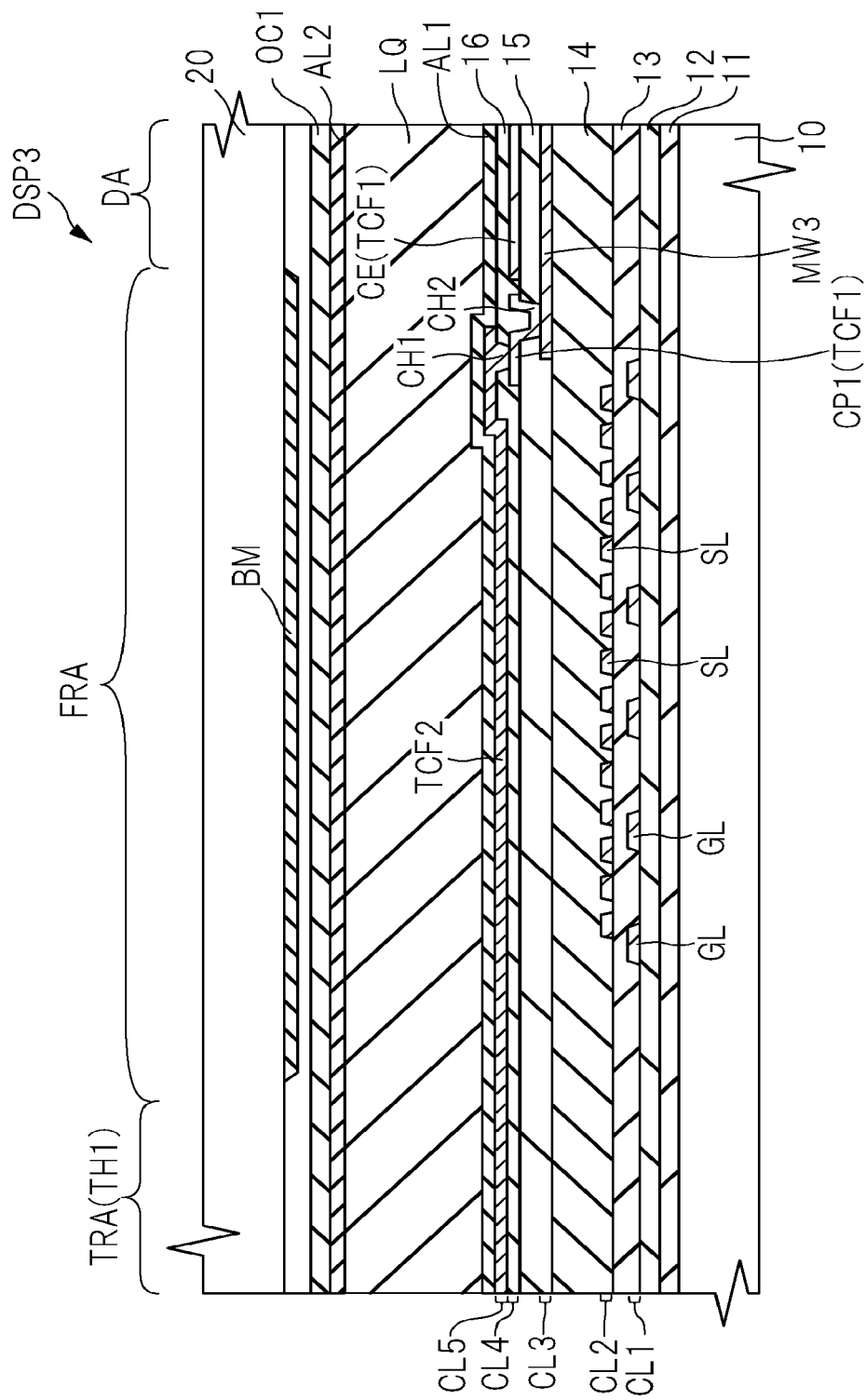
Figure 14:
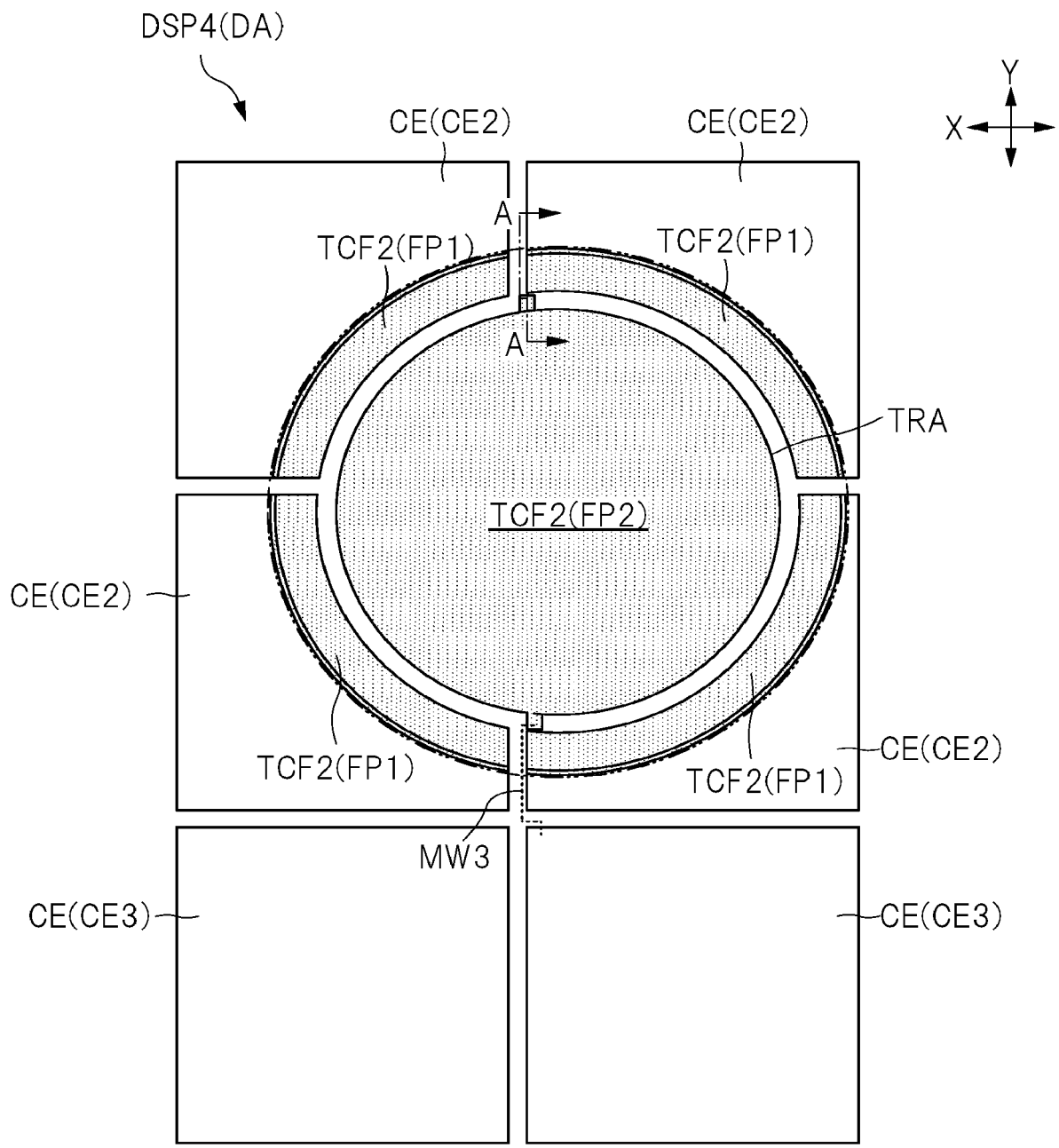
Figure 15:
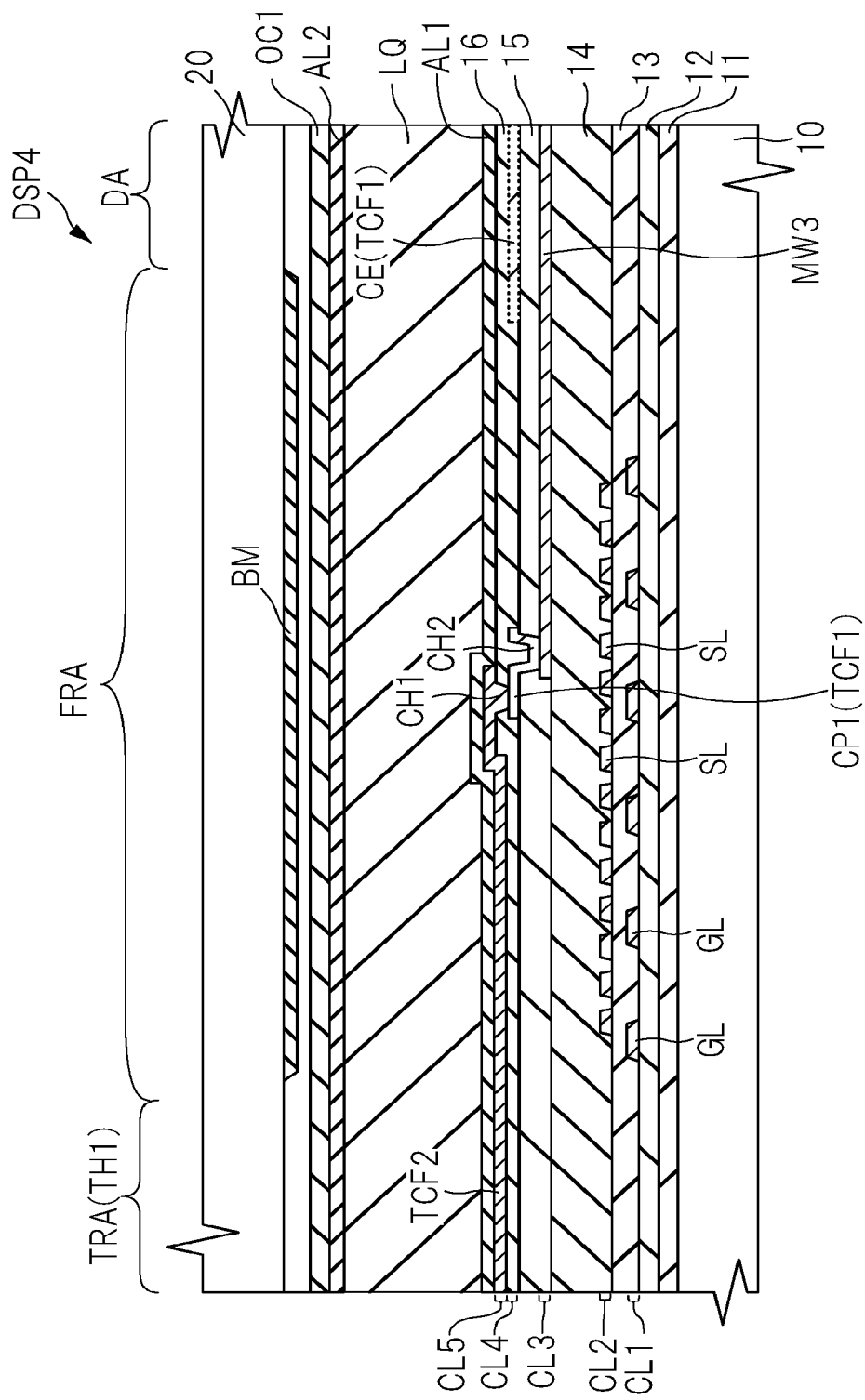
Figure 16:
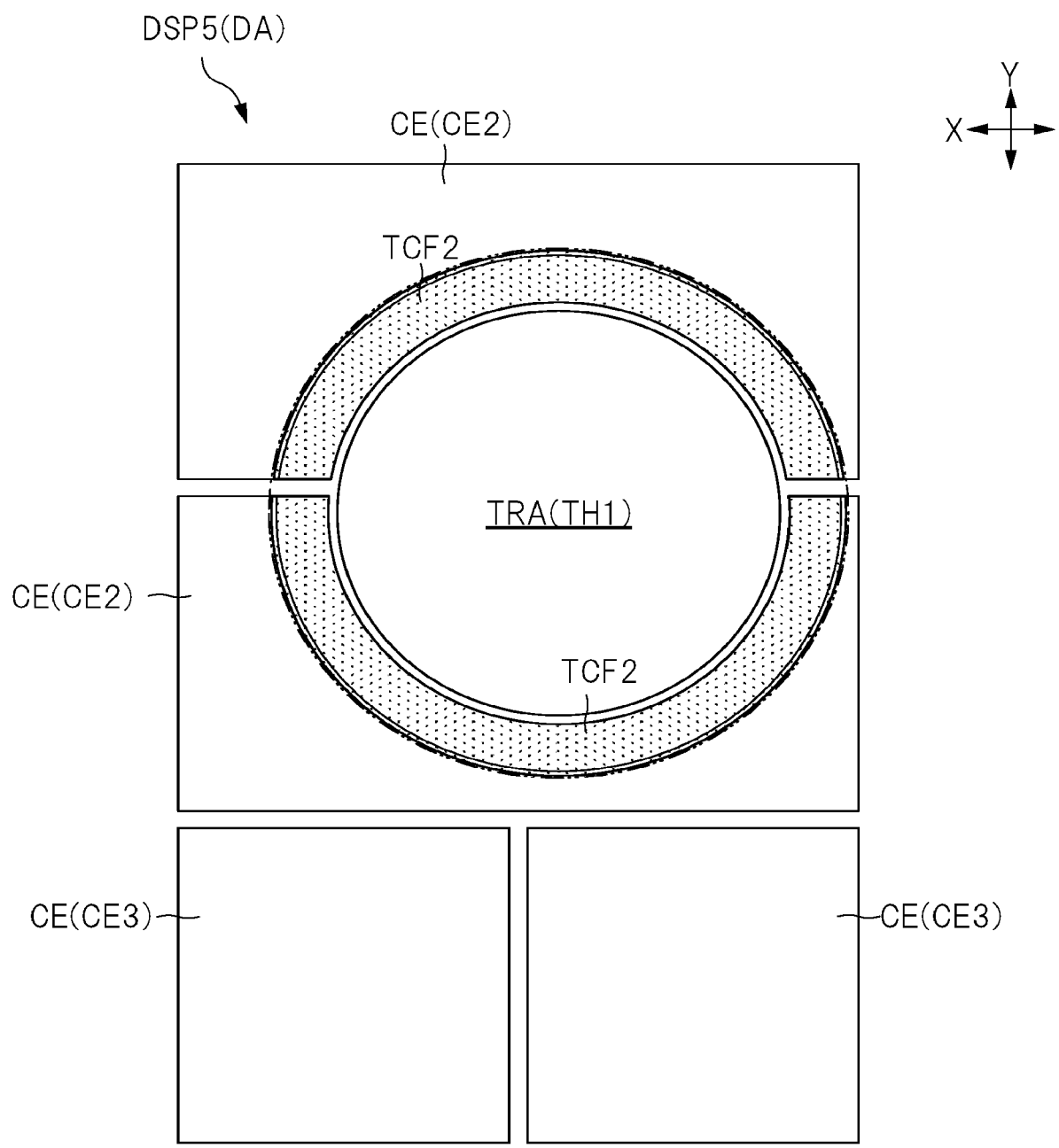
Figure 17:
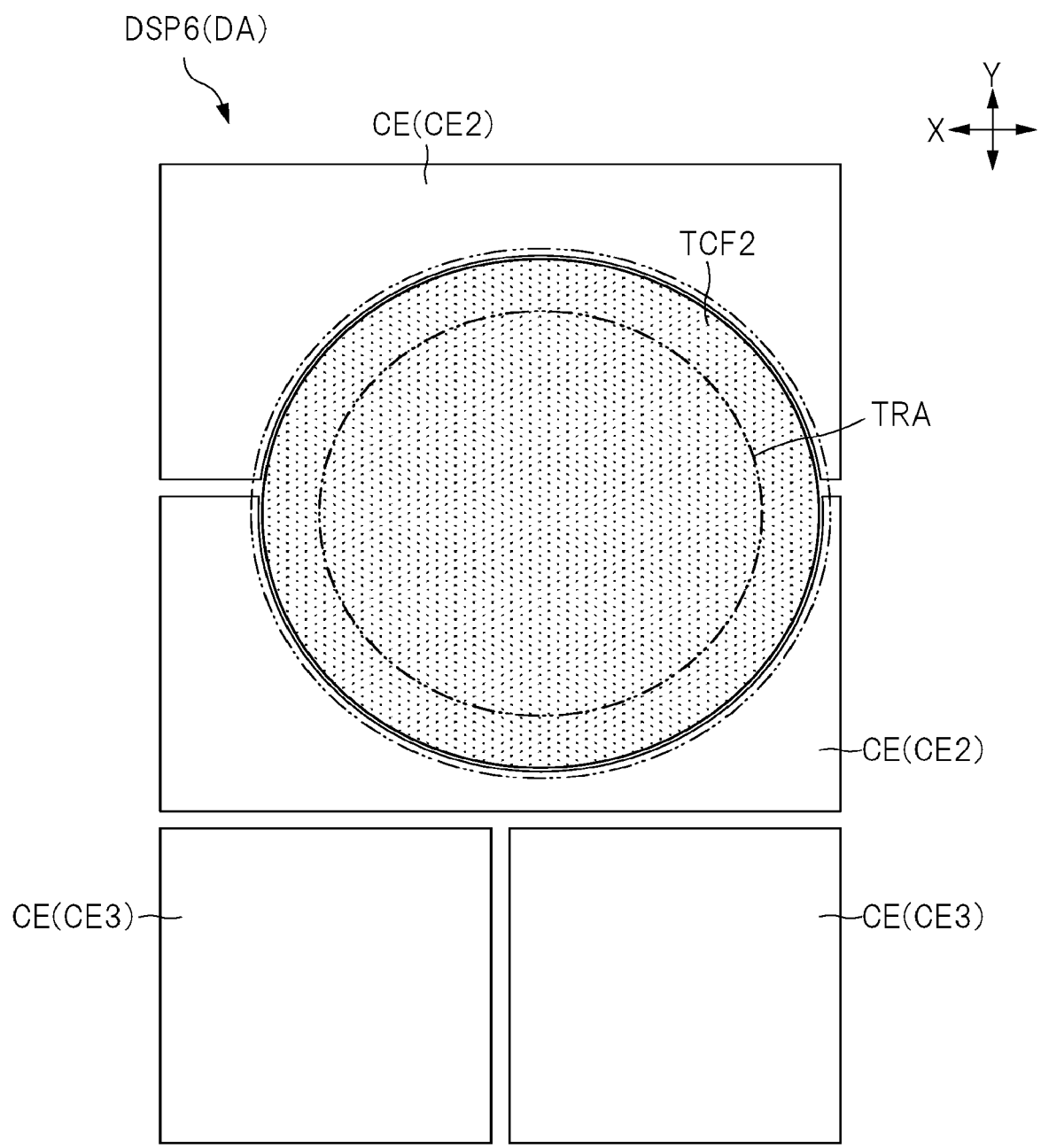

FIG. 1 is a plan view of a region of a display surface showing one example of a display apparatus according to one embodiment;
FIG. 2 is a cross-sectional view taken along a line A-A of FIG. 1;
FIG. 3 is an enlarged cross-sectional view taken along a line B-B of FIG. 1;
FIG. 4 is a circuit diagram showing a circuit configuration example in periphery of a pixel included in the display apparatus shown in FIG. 1;
FIG. 5 is an enlarged cross-sectional view of a display region of the display apparatus shown in FIG. 2;
FIG. 6 is a plan view showing a layout example of a common electrode (detection electrode) included in the display apparatus shown in FIG. 1;
FIG. 7 is an enlarged plan view showing a layout of a transparent conductive film arranged in a transparent region of FIG. 6;
FIG. 8 is an enlarged cross-sectional view taken along a line A-A of FIG. 7;
FIG. 9 is an enlarged cross-sectional view of a display apparatus according to a modification example of the display apparatus shown in FIG. 3;
FIG. 10 is an enlarged plan view showing a layout of a transparent conductive film arranged in a transparent region of the display apparatus shown in FIG. 9;
FIG. 11 is an enlarged cross-sectional view taken along a line A-A of FIG. 10;
FIG. 12 is an enlarged plan view showing a modification example of the display apparatus shown in FIG. 10;
FIG. 13 is an enlarged cross-sectional view taken along a line A-A of FIG. 12;
FIG. 14 is an enlarged plan view showing another modification example of the display apparatus shown in FIG. 7;
FIG. 15 is an enlarged cross-sectional view taken along a line A-A of FIG. 14;
FIG. 16 is an enlarged plan view of a display apparatus according to another modification example of the display apparatus shown in FIG. 7; and
FIG. 17 is an enlarged plan view of a display apparatus according to still another modification example of the display apparatus shown in FIG. 12.

BEST MODE FOR CARRYING OUT THE INVENTION

Hereinafter, each embodiment of the present invention will be described with reference to the accompanying drawings. Note that only one example is disclosed, and appropriate modification keeping the concept of the present invention which can be easily anticipated by those who are skilled in the art is obviously within the scope of the present invention. Also, in order to make the description clear, a width, a thickness, a shape, and others of each portion in the drawings are schematically illustrated more than those in an actual aspect in some cases. However, the illustration is only an example, and does not limit the interpretation of the present invention. In the present specification and each drawing, similar elements to those described earlier for the already-described drawings are denoted with the same or similar reference characters, and detailed description for them is appropriately omitted in some cases.

In the following embodiments, a liquid crystal display apparatus having a liquid crystal layer that is an electrooptic layer will been exemplified as the display apparatus for explanation. However, the following techniques explained are applicable to not only the liquid crystal display apparatus but also various modification examples. For example, the electrooptic layer may be a layer including an element having an optical property that is changeable when being applied with electrical energy, such as not only a liquid crystal layer but also an organic luminous element layer, an inorganic luminous element layer including a micro LED, a MEMS (Micro Electro Mechanical Systems) shutter, an electrophoretic element layer or others.

The liquid crystal display apparatuses are roughly classified into the following two types depending on an application direction of an electric field for use in changing alignments of liquid crystal molecules of a liquid crystal layer. That is, a first type is so-called vertical electric field mode that applies the electric field in a thickness direction (or an out-of-plane direction) of the display apparatus. The vertical electric field mode includes, for example, a TN (Twisted Nematic) mode, a VA (Vertical Alignment) mode and others. A second type is so-called horizontal electric field mode that applies the electric field in a planar direction (or an in-plane direction) of the display apparatus. The horizontal electric field mode includes, for example, an IPS (In-Plane Switching) mode, a FFS (Fringe Field Switching) mode that is one of the IPS modes and others. The following techniques explained is applicable to both the vertical electric field mode and the horizontal electric field mode. However, in embodiments explained below, the display apparatus of the horizontal electric field mode will be exemplified for explanation.

First Embodiment

<Configuration of Display Apparatus>

First, a configuration of the display apparatus will be explained. FIG. 1 is a planar view of a region of a display surface as one example of the display apparatus of the present embodiment. In FIG. 1, each of a boundary between the display region DA and the peripheral region PFA, a boundary between the display region DA and the frame region FRA and a boundary between the frame region FRA and the transparent region TRA is illustrated with a dashed double-dotted line. In FIG. 1, a region where a sealing member SLM is arranged is illustrated with a dot pattern. FIG. 2 is a cross-sectional view taken along a line A-A of FIG. 1. Although a plurality of conductive layers and insulating layers in addition to the liquid crystal layer LQ exist between a substrate 10 and a substrate 20 as shown in FIG. 5 described later, illustration of these layers is omitted in FIG. 2. FIG. 3 is an enlarged cross-sectional view taken along a line B-B of FIG. 1. FIG. 4 is a circuit diagram showing an example of a circuit configuration in periphery of a pixel in the display region DA included in the display apparatus shown in FIG. 1. FIG. 5 is an enlarged cross-sectional view of the display region of the display apparatus shown in FIG. 2. In FIG. 5, in order to show an example of positional relation between a scan signal line GL and an image signal line SL in a thickness direction of the substrate 10 (a "Z" direction shown in FIG. 5), the scan signal line GL that is arranged on a different cross section from that of FIG. 5 is illustrated with a dotted line.

As shown in FIG. 1, the display apparatus DSP1 of the present embodiment includes the display region DA. In the display region DA, an image is formed in accordance with an input signal that is supplied from outside. The display region DA is an effective region where the display apparatus DSP1 displays the image in a planar view in which the display surface is viewed. The display apparatus DSP1 includes the peripheral region (non-display region) PFA in periphery of the display region DA in a planar view. While the display apparatus DSP1 includes the peripheral region PFA in periphery of the display region DA, a display apparatus including a display region DA reaching an edge is also exemplified as a modification example. The techniques described below are also applicable to the display apparatus of such a type including the display region DA reaching the edge of the display apparatus. While the display region DA of the display apparatus DSP1 shown in FIG. 1 is rectangular, the display region may be not rectangular but polygonal or circular. For example, each of four corners of the display region DA is rounded in some cases.

The display apparatus DSP1 also includes the transparent region TRA and the frame region FRA inside the display region DA in a planar view. The frame region FRA surrounds the transparent region TRA along an outer edge of the transparent region TRA in a planar view, and is between the display region DA and the transparent region TRA. The frame region FRA is shielded from the light by a light-blocking film BM described later, and the frame region FRA is also referred to as a "light-blocking region". The transparent region TRA is a region where a component such as a camera CAM (see FIG. 3) attached to the display apparatus DSP1 is arranged. The transparent region TRA is formed so as to transmit visible light in order to emit the visible light to the component such as the camera CAM. In a substrate and a polarizer configuring the display apparatus, for example, an opening is formed in the transparent region TRA. Alternatively, in the transparent region TRA, a visible-light transmittable member is arranged but alight-blocking member such as a metal wiring is not arranged. In the transparent region TRA and the frame region FRA, note that components such as a microphone and a speaker may be arranged in addition to the camera CAM.

As shown in FIG. 2, the display apparatus DSP1 includes the substrate 10 and the substrate 20 that are bonded to each other through the liquid crystal layer LQ so as to face each other. The substrate 10 and the substrate 20 face each other in the thickness direction (Z direction) of the display apparatus DSP1. The substrate 10 has a front surface (main surface, plane) 10$f$ that faces the liquid crystal layer LQ (and the substrate 20). And, the substrate 20 has aback surface (main surface, plane) 20$b$ that faces the front surface 10$f$ of the substrate 10 (and the liquid crystal layer LQ). The substrate 10 is an array substrate in which a plurality of transistors (transistor elements) Tr1 (see FIG. 4) functioning as switching elements (active elements) are arranged in an array form. The substrate 20 is a substrate that is formed in a region closer to the display surface. The substrate 20 can be also referred to as an opposed substrate meaning a substrate that is arranged to face the array substrate.

The liquid crystal layer LQ is between the front surface 10f of the substrate 10 and the back surface 20b of the substrate 20. The liquid crystal layer LQ is an electrooptic layer that controls a state of transmittance of the visible light. This has a function of modulating light that travels through itself by controlling a state of an electric field that is formed around the liquid crystal layer LQ through the switching element. The display region DA included in the substrate 10 and the substrate 20 overlaps the liquid crystal layer LQ as shown in FIG. 2.

The substrate 10 and the substrate 20 are bonded to each other through a sealing member (adhesive member) SLM. As shown in FIG. 1, the sealing member SLM is arranged in the peripheral region PFA so as to surround the display region DA. As shown in FIG. 2, the liquid crystal layer LQ is inside the sealing member SLM. The sealing member SLM plays a role of a sticker for sealing the liquid crystal between the substrate 10 and the substrate 20. Besides, the sealing member SLM plays a role of an adhesive member for bonding the substrate 10 and the substrate 20.

As shown in FIG. 3, in the case of the display apparatus DSP1, a through hole TH1 that penetrates the substrate 10 and the substrate 20 is formed in the transparent region TRA. The through hole TH1 has a planar shape formed along a shape (a circular shape in the case of FIG. 1) of the transparent region TRA shown in FIG. 1. In an example shown in FIG. 3, the through hole TH1 penetrates each of the backlight unit BL, an optical device OD1, the substrate 10, the substrate 20 and an optical device OD2. The sealing member SLM is arranged between the liquid crystal layer LQ and the through hole TH1. The sealing member SLM is arranged in the frame region FRA. Since the sealing member SLM is arranged in the frame region FRA, the liquid crystals of the liquid crystal layer LQ can be prevented from leaking into the through hole TH1.

The display apparatus DSP1 includes the optical device OD1 and the optical device OD2. The optical device OD1 is arranged between the substrate 10 and the backlight unit BL. The optical device OD2 is arranged in a region closer to the display surface of the substrate 20, in other words, is opposite to the substrate 10 across the substrate 20. Each of the optical device OD1 and the optical device OD2 includes at least a polarizer, and may include a retardation film if needed. As shown in FIG. 3, in the transparent region TRA, the optical devices OD1 and OD2 that can be obstructive factors for transparency are not formed. More specifically, each of the optical devices OD1 and OD2 has an opening (the through hole TH1) that is formed at a position overlapping the transparent region TRA so as to extend along the shape of the transparent region TRA.

The display apparatus DSP1 includes a cover member CVM (see FIG. 2) that covers the region closer to the display surface of the substrate 20. The cover member CVM faces the front surface (plane) 10f opposite to the back surface (plane) 20b of the substrate 20. In other words, the cover member CVM faces the front surface (plane) 20f opposite to the back surface (plane) 20b of the substrate 20. The substrate 20 is between the cover member CVM and the substrate 10 in the Z direction. The cover member CVM is a protective member that protects the substrates 10 and 20 and the optical device OD2, and is arranged in the region closer to the display surface of the display apparatus DSP1. However, as a modification example of the present embodiment, a case without the cover member CVM is exemplified in some cases. As shown in FIG. 3, in the present embodiment, the through hole TH1 is not formed at a position of the cover member CVM, the position overlapping the transparent region TRA. In other words, the camera CAM inserted in the through hole TH1 is covered with the cover member CVM.

Each of the substrate 10 and the substrate 20 is a transparent plate having visible-light transmittable property (that is characteristics for allowing the visible light to penetrate). As the substrate that is the transparent plate, a glass substrate can be exemplified. As a constituent material of each of the substrate and the substrate 20, a resin material (visible-light transmittable resin material) containing a polymer such as polyimide, polyamide, polycarbonate, polyester or others can be also used. In the case of the substrate made of the resin material such as polyimide, the substrate has flexibility. When the substrate 10 has flexibility, apart (such as the peripheral region PFA) of the substrate 10 can be curved or bent. When the substrate 10 and the substrate 20 have flexibility, the area of the peripheral region PFA in a planar view can be reduced. In this case, the occupancy of the effective display region in a planar view can be increased.

As shown in FIG. 4, a plurality of pixels PX are arranged in the display region DA. In the example shown in FIG. 4, each of the plurality of pixels PX has a plurality of subpixels PXs. The plurality of subpixels PXs include subpixels PXs for, for example, red, blue and green. By control for a color tone of the plurality of subpixels PXs, a color image can be displayed. The number of types of the subpixels PXs configuring one pixel PX is not only three exemplified in FIG. 4, and various modification examples are applicable.

Each of the plurality of subpixels PXs includes a transistor Tr1 that is a switching element for controlling the turning ON/OFF of the electric field applied on the liquid crystal layer LQ. The transistor Tr1 controls an operation of the subpixel PXs. As described later, the transistor Tr1 is a thin film transistor (TFT) that is formed on the substrate 10.

As shown in FIG. 4, the display apparatus DSP1 includes a plurality of scan signal lines GL extending in an X direction in the display region DA and a plurality of image signal lines SL extending in a Y direction that crosses (in FIG. 4, that is orthogonal to) the X direction in the display region DA. The scan signal line GL is a gate line that is connected to agate of the transistor Tr1. The image signal line SL is a source line that is connected to a source of the transistor Tr1. Each of the plurality of scan signal lines GL extends in the X direction, and is arrayed to insert, for example, an equal interval therebetween in the Y direction. Each of the plurality of image signal lines SL extends in the Y direction, and is arrayed to insert, for example, an equal interval therebetween in the X direction.

Each of the plurality of scan signal lines GL is connected to a scan driving circuit (gate driving circuit) GD. A scan signal Gsi that is output from the scan driving circuit GD is input to the gate of the transistor Tr1 through the scan signal line GL. Each of the plurality of image signal lines SL is connected to an image-signal driving circuit SD. An image signal Spic that is output from the image-signal driving circuit SD is input to the source of the transistor Tr1 through the image signal line SL.

Each of the plurality of image signal lines SL is connected to a pixel electrode PE through the transistor Tr1. More specifically, the image signal line SL is connected to the source of the transistor Tr1, and the pixel electrode PE is connected to a drain of the transistor Tr1. When the transistor Tr1 is being turned ON, the image signal Spic is supplied from the image signal line SL to the pixel electrode PE. The pixel electrode PE is connected to a common electrode CE through a dielectric layer (a capacitance element CS shown in FIG. 4). To the electrode CE functioning as the common electrode, a fixed potential is supplied from a common-potential supplying circuit CD in a display period where the image is displayed in the display region DA. The fixed potential that is supplied to the electrode CE is a common potential among the plurality of subpixels PXs. In the display period, the electric field is formed in each subpixel PXs in accordance with a potential difference between the potential that is supplied to the electrode CE and the potential that is supplied to the pixel electrode PE, and liquid crystal molecules contained in the liquid crystal layer LQ are driven by this electric field.

Each of the scan driving circuit GD, the image-signal driving circuit SD and the common-potential supplying circuit CD shown in FIG. 4 is formed in the peripheral region PFA shown in FIG. 1 or a wiring board FWB1 connected to the peripheral region PFA. As shown in FIG. 2, one end of the wiring board FWB1 is connected to a terminal TM1 that is formed to be closer to the front surface 10f of the substrate 10. The other end of the wiring board FWB1 is arranged to be closer to the back surface 10b of the substrate 10. The wiring board FWB1 is connected to a circuit board CB1.

As shown in FIG. 5, a plurality of conductive layers CL1 to CL5, a plurality of insulating films 11 to 16 and an alignment film AL1 are formed between the substrate 10 and the liquid crystal layer LQ. The plurality of conductive layers CL1 to CL5, the plurality of insulating films 11 to 16 and the alignment film AL1 are formed on the front surface 10f of the substrate 10. The light-blocking film BM, the color filters CFR, CFG and CFB, the insulating film OC1 and an alignment film AL2 are formed between the substrate 20 and the liquid crystal layer LQ. The light-blocking film BM, the color filters CFR, CFG and CFB, the insulating film OC1 and the alignment film AL2 are formed on the back surface 20b of the substrate 20.

In each of the conductive layers CL1, CL2 and CL3 shown in FIG. 5, a metallic conductor pattern (metallic wiring) is formed. Each of the conductive layer CL1 and the conductive layer CL3 includes a metallic film made of, for example, a metal such as molybdenum (Mo) or tungsten (W) or an alloy of such a metal. The conductor pattern of the conductive layer CL2 includes a metallic film having, for example, a multilayer structure such as a layered film made of an aluminum (Al) film sandwiched by a titanium (Ti) film, a titanium nitride (TiN) film or others. Each of the conductive layer CL4 and the conductive layer CL5 mainly includes a conductive oxide material (transparent conductive material) such as ITO (Indium Tin Oxide), IZO (Indium Zinc Oxide) or others. In the present specification, a conductive film that is made of a material having visible-light transmittance and conductivity such as ITO and IZO is called a transparent conductive film.

An insulating film intervenes between the conductive layers CL1 to CL5, respectively. An insulating film 11 and an insulating film 12 intervene between the conductive layer CL1 and the substrate 10. An insulating film 13 intervenes between the conductive layer CL1 and the conductive layer CL2. An insulating film 14 intervenes between the conductive layer CL3 and the conductive layer CL4. An insulating film 15 intervenes between the conductive layer CL4 and the conductive layer CL5. The alignment film AL1 intervenes between the conductive layer CL5 and the liquid crystal layer LQ. Each of the insulating films 11, 12, 13 and 16 is an inorganic insulating film. As the inorganic insulating film, for example, a silicon nitride (SiN) film, a silicon oxide (SiO) film, an aluminum oxide (AlOx) film or a layered film made of such films can be exemplified. Each of the insulating film 14 and the insulating film 15 is an organic insulating film. When an insulating film made of an organic material is formed to be thicker than an insulating film made of an inorganic material, an upper surface (front surface) can be planarized. Each of the insulating film 14 and the insulating film 15 is used as a planarizing film for planarizing surface unevenness of the conductor pattern formed in a lower layer. Therefore, a thickness of each of the insulating film 14 and the insulating film 15 is larger than that of each of the insulating films 11, 12 and 13 that are the inorganic insulating films. As an example of the organic insulating films, an acrylic-based light-sensitive resin or others can be exemplified.

Each of the plurality of scan signal lines GL is formed in the conductive layer CL1 above the substrate 10. The insulating film 11 and the insulating film 12 are layered on the substrate 10, and the scan signal line GL is formed on the insulating film 12. Each of the plurality of image signal lines SL is formed in the conductive layer CL2 above the substrate 10. The insulating films 11, 12 and 13 are layered on the substrate 10, and the image scan signal line SL is formed on the insulating film 13.

A semiconductor layer of the transistor (transistor element) Tr1 shown in FIG. 3 is formed between the insulating film 11 and the insulating film 12. Since the semiconductor layer is on a cross section that is different from FIG. 4, the semiconductor layer is not illustrated in FIG. 4. A source region of the semiconductor layer is electrically connected to the image signal line SL formed in the conductive layer CL2. A drain region of the semiconductor layer is electrically connected to the pixel electrode PE formed in the conductive layer CL5. In a planar view, the scan signal line GL extends in a gap between the source region and the drain region of the semiconductor layer. The scan signal line GL overlaps a channel region of the semiconductor layer, and functions as the gate electrode of the transistor Tr1. The insulating film 12 that intervenes between the channel region and the scan signal line GL functions as a gate insulating film. As seen in the example described above, a TFT that is structured so that the gate electrode is arranged on an upper side of the channel region of the transistor Tr1 is called top gate mode. However, there are various modification examples of the TFT mode. For example, a bottom gate mode in which the gate electrode is arranged on a lower side of the channel region may be used. Alternatively, a mode in which the gate electrode is arranged on both the upper and lower sides of the channel region is also exemplified.

A wiring MW3 is arranged in the conductive layer CL3. The wiring MW3 is a metallic wiring made of a metal as similar to the scan signal line GL and the image signal line SL. The wiring MW3 is arranged at a position overlapping the image signal line SL in the thickness direction (Z direction). The wiring MW3 is electrically connected to the electrode CE that is formed in the conductive layer CL4. In this case, the wiring MW3 can be used as a wiring for supplying a potential to the electrode CE. As described later, in the display apparatus DSP1 functioning as a touch panel, the electrode CE is used as a detection electrode detecting an input position (touch position) by using change in an electrostatic capacitance. The wiring MW3 electrically connects the detection circuit and the electrode CE for use in the detection of the input position. In this case, the wiring MW3 is used as a signal transmission passage in which a driving signal or a detection signal for use in the detection of the touch position is transmitted.

The conductive layer CL4 includes a visible-light transmittable transparent conductive film TCF1 and is arranged between the substrate 10 and the substrate 20. In the conductive layer CL4, the electrode CE is formed. A plurality of transparent conductive films TCF1 formed in the conductive layer CL4 include the electrode CE. The electrode CE is formed on the insulating film 15 that is the planarizing film. FIG. 4 shows one electrode CE. However, in the display region DA shown in FIG. 1, a plurality of electrodes CE may be arranged so as to separate from one another. And, as described above, to the electrode CE, the common potential among the plurality of subpixels PXs is supplied. Therefore, as shown in FIG. 4, the electrode CE may be formed all over the plurality of subpixels PXs. In the present embodiment, the electrode CE is used as the detection electrode for use in the detection of the input position as described later. Therefore, in the display region DA shown in FIG. 1, a plurality of electrodes CE are arranged so as to separate from one another. A layout of the electrodes CE in a planar view will be described in detail later.

The conductive layer CL5 includes the visible-light transmittable transparent conductive films TCF2 and is arranged between the conductive layer CL4 and the substrate 20. In the conductive layer CL5, a plurality of pixel electrodes PE are formed. The plurality of transparent conductive films TCF2 formed in the conductive layer CL5 include a plurality of pixel electrodes PE. The insulating film 16 that is the inorganic insulating film intervenes between the conductive layer CL5 where the pixel electrode PE is formed and the conductive layer CL4 where the electrode CE is formed. This insulating film 16 functions as the dielectric layer to form the capacitance element CS shown in FIG. 3.

The plurality of pixel electrodes PE are covered with the alignment film AL1. The alignment film AL1 is the organic insulating film having a function of unifying initial alignments of liquid crystal molecules contained in the liquid crystal layer LQ, and is made of, for example, a polyimide resin. The alignment film AL1 is in contact with the liquid crystal layer LQ.

As shown in FIG. 4, a light-blocking film BM, color filters CFR, CFG and CFB, an insulating film OC1 and an alignment film AL2 are formed on the back surface (main surface, plane) 20b of the substrate 20.

The color filters CFR, CFG and CFB are formed in a region closer to the back surface 20b that faces the substrate 10. In the example shown in FIG. 3, the color filters CFR, CFG and CFB of three colors that are red (R), green (G) and blue (B) are periodically arranged. In the color display apparatus, a color image is displayed by grouping, for example, the three-color pixels of the red (R), the green (G) and the blue (B) into one set. The plurality of color filters CFR, CFG and CFB of the substrate 20 are arranged at positions facing the respective pixels PX (see FIG. 1) having the respective pixel electrodes PE formed in the substrate 10. Note that types of the color filters are not limited to the three colors that are the red (R), the green (G) and the blue (B).

The light-blocking film BM is arranged on boundaries among the color filters CFR, CFG and CFB of the respective colors. The light-blocking film BM is called black matrix, and is made of, for example, a black resin or a low-reflective metal. The light-blocking film BM in the display region DA is formed to have, for example, a grid form in a planar view. In other words, the light-blocking film BM extends in the X and the Y directions. More specifically, the light-blocking film BM has a plurality of portions extending in the Y direction and a plurality of portions extending in the X direction crossing the Y direction. Each pixel PX is partitioned by the black matrix, so that light leakage and color mixture can be suppressed.

In the display region DA, the light-blocking film BM overlaps the scan signal line GL, the image signal line SL and the wiring MW3 that are the metal wirings. Since the metal wiring having the light-blocking property is arranged at the position overlapping the light-blocking film BM, the metal wiring is difficult to be visually recognized on the display screen. On the other hand, at least a part of each of the electrode CE and the pixel electrode PE is arranged at a position not overlapping the light-blocking film BM. Each of the electrode CE and the pixel electrode PX is made of a visible-light transmittable conductive material. Therefore, even when each of the electrode CE and the pixel electrode PE is arranged at the position not overlapping the light-blocking film BM, the visible light is not blocked at each subpixel PXs by the electrode CE and the pixel electrode PE.

The light-blocking film BM is also formed in the peripheral region PFA (see FIG. 1) of the substrate 20. The peripheral region PFA overlaps the light-blocking film BM. The display region DA is defined as an inner region of the peripheral region PFA. The peripheral region PFA is a region overlapping the light-blocking film BM that blocks the light that is emitted from the backlight unit (light source) BL shown in FIG. 2. While the light-blocking film BM is also formed inside the display region DA, the light-blocking film BM in the display region DA is formed to have a plurality of openings. Generally, among the openings which are formed in the light-blocking film BM and from which the color filters are exposed, an end of an opening that is formed in the closest region to an edge is defined as the boundary between the display region DA and the peripheral region PFA. Also, as schematically shown in FIG. 3, the transparent region TRA does not overlap the light block film BM while the frame region FRA overlaps the light block film BM. In this case, even when the metal wiring is arranged to have a narrow pitch therebetween in the frame region FRA, optical influence of the metal wiring in the frame region FRA can be reduced.

The insulating film OC1 shown in FIG. 5 covers the color filters CFR, CFG and CFB. The insulating film OC1 functions as a protective film that prevents impurities from spreading from the color filters to the liquid crystal layer. The insulating film OC1 is an organic insulating film made of, for example, an acrylic-based light-sensitive resin or others.

The insulating film OC1 is covered with the alignment film AL2. The alignment film AL2 is an organic insulating film having a function of unifying the initial alignments of the liquid crystal molecules contained in the liquid crystal layer LQ, and is made of, for example, a polyimide resin. The alignment film AL2 is in contact with the liquid crystal layer LQ.

<Touch Panel Function>

Next, a touch panel function included in the display apparatus DSP1 of the present embodiment will be explained. FIG. 6 is a plan view showing a layout example of a common electrode (detection electrode) included in the display apparatus shown in FIG. 1.

The display apparatus DSP1 is a display apparatus with a sensor having the touch panel function for use in the detection of the input position by using the change in the electrostatic capacitance in a sensor region overlapping the display region DA. The display region DA shown in FIG. 1 includes the sensor region functioning as a detection device having the touch panel function for use in the detection of the change in the electrostatic capacitance. As shown in FIG. 6, the display apparatus DSP1 includes a plurality of electrodes CE that separate from one another. In the display region DA, the plurality of electrodes CE are arranged in a matrix form in the X direction and the Y direction. Each of the electrodes CE is schematically illustrated to be rectangular or a square in a planar view. The electrode CE is made of, for example, the conductive material such as ITO having the visible-light transmittance as described above.

In a region closer to a shorter side of the peripheral region PFA, a connection circuit MP is arranged. The wiring board FWB1 is connected to the region closer to the shorter side of the peripheral region PFA, and a detection circuit (detection control circuit) DP for controlling the touch panel function is arranged in the wiring board FWB1. The connection circuit MP and the detection circuit DP are electrically connected to each other through the wiring board FWB1. The arrangement of the connection circuit MP and the detection circuit DP is not limited to the example shown in FIG. 6, and the connection circuit MP and the detection circuit DP may be arranged on, for example, the substrate 10 of the display apparatus DSP1. Alternatively, the connection circuit MP and the detection circuit DP may be arranged on the control substrate outside the module or the wiring board FWB1.

The electrode CE is electrically connected to the detection circuit DP through the wiring MW3 and the connection circuit MP. The wiring MW3 supplies the driving signal to be supplied to the electrode CE to transmit a signal depending on the change in the electrostatic capacitance to an analog front end. The plurality of wirings MW3 are electrically connected to the plurality of electrodes CE arranged in the display region DA, respectively, and are led out to reach the peripheral region PFA. Each of the plurality of wirings MW3 extends in the Y direction, and the plurality of wirings MW3 are lined in the X direction. For example, the driving circuit included in the detection circuit DP is connected to each of the plurality of electrodes CE through the wiring MW3 and the connection circuit MP arranged in the peripheral region PFA.

The detection circuit DP includes a circuit for supplying the driving signal for use in the detection of the change in the electrostatic capacitance in a detection period where the touch panel function of the display apparatus DSP1 operates and a circuit for receiving the detection signal output from the electrode CE. The connection circuit MP is arranged between the electrode CE and the detection circuit DP. The connection circuit MP is a circuit for switching the connection and the disconnection between the detection circuit DP and the electrode CE that is a target for the detection, on the basis of the control signal supplied from the detection circuit DP. The connection circuit MP includes the analog front end. And, the connection circuit MP may be a built-in circuit on the substrate 10 or a driver IC mounted on the substrate 10.

In the insulating film 15 shown in FIG. 5, an opening (contact hole) not illustrated is formed at a position at which the electrode CE and the wiring MW3 overlap each other, and the electrode CE and the wiring MW3 are electrically connected to each other through this opening. In the example shown in FIG. 6, one wiring MW3 and one electrode CE are electrically connected to each other. However, one electrode CE may be electrically connected to the plurality of wirings MW3. In this case, a bundle of the plurality of wirings MW3 that are connected to one electrode CE forms a transmission passage for the detection signal and the driving signal for use in the touch detection.

In the display apparatus DSP1, a display period in which the liquid crystal layer LQ (see FIG. 2) is driven to display the image and a detection period in which the electrode CE is driven to detect the input position are alternately repeated.

In the electrode CE in the display period, a common potential is supplied to the plurality of pixels in order to form an electric field for driving the liquid crystal layer LQ. In other words, in the display period, the electrode CE functions as a common electrode. In the detection period, the driving signal for use in the detection of the input position is supplied from the detection circuit DP and is input to the electrode CE. In other words, in the detection period, the electrode CE functions as a driving electrode for use in the detection of the input position in the sensor region. And, in the detection period, the electrode CE outputs the detection signal corresponding to the input driving signal. In other words, in the detection period, the electrode CE functions as a detection electrode for use in the detection of the input position in the sensor region.

The detection signal from the electrode CE is changed by the influence of the electrostatic capacitance around the electrode CE. When an input tool such as a finger approaches the vicinity of one electrode CE of the plurality of electrodes CE, the electrostatic capacitance around the electrode CE is changed by the influence of the input tool. In this case, a detection signal that is output from an electrode CE near the input tool is different in a waveform from a detection signal that is output from a different electrode CE. The detection circuit DP receives the respective detection signals that are supplied from the plurality of electrodes CE, and identifies the input position on the basis of these detection signals.

The electrode CE of the present embodiment has the function serving as the driving electrode to which the driving signal is supplied and the function serving as the detection electrode which outputs the detection signal. However, as a modification example, the driving electrode and the detection electrode may be separately prepared. For example, when the electrode CE is used as the driving electrode, the detection electrode may be prepared to separate from the electrode CE.

<Peripheral Structure of Transparent Region>

Next, a peripheral structure of the transparent region TRA shown in FIG. 6 will be explained. FIG. 7 is an enlarged plan view showing a layout of the transparent conductive film arranged in the transparent region of FIG. 6. Although FIG. 7 is a plan view, the transparent conductive film TCF2 is added with a dot pattern in order to define an outline of the transparent conductive film TCF2. FIG. 8 is an enlarged cross-sectional view taken along a line A-A of FIG. 7.

In the display apparatus DSP1 of the present embodiment, the transparent region TRA exists inside the display region DA in a planar view as shown in FIG. 6. Since the through hole TH1 exists in the transparent region TRA as shown in FIG. 3, the electrode CE shown in FIG. 6 is not formed in the transparent region TRA. However, when the through hole TH1 is formed as seen in the display apparatus DSP1, it has been found that a member arranged in periphery (such as the frame region FRA) of the through hole TH1 is easily electrically charged, so that the electrical charge becomes a source of noises at the time of the image display operation and the touch detection operation. For example, as shown in FIG. 8, the plurality of scan signal lines GL and the plurality of image signal lines SL are densely arranged in the frame region FRA. When the electrical charge charged on the member in the frame region FRA affects these signal transmission passages, the electrical charge becomes the noises for the image display operation. And, the plurality of electrodes CE are arranged in the periphery of the through hole TH1. When the electrical charge affects the driving signal supplied to the electrode CE and the detection signal output from the electrode CE affects at the time of the touch detection operation, the electrical charge becomes the noises for the touch detection. In order to stabilize the operations of the display apparatus DSP1, it is necessary to suppress the electrical charge on the member in the periphery of the through hole TH1.

As shown in FIG. 7, the display apparatus DSP1 includes the transparent conductive film TCF2 arranged in the frame region FRA in a planar view. In the display region DA of the display apparatus DSP1, in the conductive layer CL4 shown in FIG. 5, a plurality of transparent conductive films TCF1 including the plurality of electrodes CE are formed. In the conductive layer CL5, a plurality of transparent conductive films TCF2 including the pixel electrode PE are formed. In the frame region FRA, the transparent conductive film TCF2 of the conductive layer CL5 is formed.

As shown in FIG. 8, a width of the transparent conductive film TCF2 arranged in the frame region FRA is larger than each width of the image signal line SL and the scan signal line GL arranged in the frame region FRA. And, an area of the transparent conductive film TCF2 arranged in the frame region FRA is larger than each area of the image signal line SL and the scan signal line GL arranged in the frame region FRA. The electrical charge on the member in the periphery of the through hole TH1 occurs at the time of, for example, the manufacturing process of the display apparatus DSP1. Since the through hole TH1 is hollowed, the static electricity occurring at the time of the manufacturing process easily stays in the vicinity of the through hole TH1. When the conductive pattern having the large area is arranged in the vicinity of the through hole TH1 as seen in the display apparatus DSP1, the electrical charge occurring at the time of the manufacturing process tends to gather in the conductive pattern having the large area, in other words, the transparent conductive film TCF2. When the transparent conductive film TCF2 is arranged in the frame region FRA, the electrical charge can be extracted outward through this transparent conductive film. In other words, when the transparent conductive film TCF2 is arranged in the frame region FRA, the transparent conductive film TCF2 can be used as an antistatic film.

As a modification example of the antistatic film, note that a method of arranging the transparent conductive film TCF1 in the frame region FRA is also exemplified. For example, the electrode CE that is the transparent conductive film TCF1 shown in FIG. 8 may extend to a position overlapping the plurality of image signal lines SL of the frame region FRA. In this case, even if the transparent conductive film TCF2 shown in FIG. 8 is not arranged, the electrical charge charged on the transparent conductive film TCF1 can be accumulated and discharged outward. However, in the present embodiment, the electrode CE is not arranged in much of the frame region FRA. The transparent conductive film TCF2 is arranged so as to cover the much (such as 70% or more) of the frame region FRA. The electrode CE is arranged in the periphery of the boundary between the frame region FRA and the display region DA, and is electrically connected to the transparent conductive film TCF2 in a region in the periphery of this boundary. A reason for this will be described later.

In order to improve the antistatic effect of the transparent conductive film TCF2 arranged in the frame region FRA, it is preferable to connect the transparent conductive film TCF2 arranged in the frame region FRA to an electrical conductive passage. If the transparent conductive film TCF2 arranged in the frame region FRA is connected to the electrical conductive passage, the electrical charge is extracted outward through the electrical conductive passage, and therefore, the frame region FRA is difficult to be electrically charged. In the present embodiment, the transparent conductive film TCF2 in the frame region FRA is electrically connected to a part of each of the plurality of electrodes CE. Therefore, the electrical charge occurring in the frame region FRA at the time of the manufacturing process of the display apparatus DSP1 can be easily extracted out of the display apparatus DSP1 through the wiring MW3 connected to the electrode CE shown in FIG. 6.

The following effect can be obtained by the electrical connection between the electrode CE and the transparent conductive film TCF2 in the frame region FRA. In other words, electrical characteristics of an electrode CE2 arranged in the periphery of the transparent region TRA can be made close to electrical characteristics of an electrode CE3 at the position far from the transparent region TRA. As shown in FIG. 7, the plurality of electrodes CE include the electrode CE2 connected to the transparent conductive film TCF2 in the frame region FRA and the electrode CE3 that is at the position far from the frame region FRA and that is not connected to the transparent conductive film TCF2 in the frame region FRA.

In the present embodiment, since the through hole TH1 is formed in the transparent region TRA, the electrode CE2 cannot be arranged at the position overlapping the through hole TH1. In the example shown in FIG. 8, an area of the electrode CE2 is smaller than an area of the electrode CE3. When the electrode CE is used as the detection electrode (sensor) for use in the detection of the input position as described above, the areas of the plurality of electrodes CE are preferably equal to one another in a viewpoint of unifying the electrical characteristics for the sensor. Even if the areas of the plurality of electrodes CE are different from one another, an area ratio of the other electrode CE to one electrode CE is preferably within 75% to 125%.

In the display apparatus DSP1, each of the plurality of electrodes CE2 is electrically connected to the transparent conductive film TCF2. The transparent conductive film TCF2 in the frame region FRA is divided into a plurality of portions, and the plurality of portions are connected to the different electrodes CE2. In this case, at the time of the touch detection operation, the transparent conductive film TCF2 connected to the electrode CE2 functions as a part of the detection electrode. Therefore, in consideration of the electrical characteristics of the electrode CE2, the area of the transparent conductive film TCF2 connected to the electrode CE2 can be regarded as a part of the area of the detection electrode. Note that a total of the area of the electrode CE2 and the area of the transparent conductive film TCF2 connected to the electrode CE2 is different from the area of the electrode CE3. However, by the electrical connection between the electrode CE2 and the transparent conductive film TCF2, the area ratio of the electrode CE2 to the electrode CE3 can be adjusted so as to be close to 100%. As a result, the detection accuracy in the vicinity of the transparent region TRA can be improved.

The electrode CE that is electrically connected to the transparent conductive film TCF2 in the frame region FRA is used as the common electrode in the display period. Therefore, at least in the display period, a fixed potential is supplied to the transparent conductive film TCF2 through the electrode CE. Even if the transparent conductive film TCF2 is electrically charged, the electrical charge can be canceled by the supply of the fixed potential to the transparent conductive film TCF2. Therefore, even if the static electricity is caused after the completion of the display apparatus DSP1 by, for example, the working such as the attachment/detachment of the camera CAM shown in FIG. 3, the electrical charge resulting from the static electricity can be canceled by the supply of the fixed potential to the transparent conductive film TCF2. In the present embodiment, the example of the supply of the fixed potential to the transparent conductive film TCF2 through the electrode CE has been explained. However, the method of the supply of the fixed potential to the transparent conductive film TCF2 is not limited to the supply of the same through the electrode CE. If the fixed potential is supplied to the charged transparent conductive film TCF2 in some way, the electrical charge can be canceled.

The electrode CE2 and the transparent conductive film TCF2 are electrically connected to each other through a contact hole CH1 formed in the frame region FRA. More specifically, the insulating film 16 includes the contact hole CH1 that is an opening at a position overlapping the electrode CE2. The electrode CE2 in the contact hole CH1 is exposed from the insulating film 16. The transparent conductive film TCF2 is buried in the contact hole CH1, and the electrode CE2 and the transparent conductive film TCF2 are connected to each other at a base surface of the contact hole CH1. FIG. 8 illustrates one contact hole CH1. However, the electrode CE2 and the transparent conductive film TCF2 are electrically connected to each other through a plurality of contact holes CH1. This manner forms a plurality of passages that electrically connect electrode CE2 and the transparent conductive film TCF2, and therefore, the electrical characteristics of, for example, the electrode CE functioning as the detection electrode can be stabilized.

As shown in FIG. 8, the contact holes CH1 do not overlap the plurality of image signal lines SL and the plurality of scan signal lines GL. When the contact holes CH1 are arranged at the positions not overlapping the plurality of image signal lines SL and the plurality of scan signal lines GL, the parasitic capacitances of the contact holes CH1 can be suppressed from affecting the image signal lines SL and the scan signal lines GL. Therefore, a degree of freedom for the layout of the image signal lines SL and the scan signal lines GL in the frame region FRA can be improved.

As shown in FIG. 8, the sealing member SLM surrounding the through hole TH1 is arranged between the substrate 10 and the substrate 20 in the frame region FRA. The sealing member SLM is an adhesive for fixedly bonding the substrate 10 and the substrate 20. The sealing member SLM is made of the same material as that of the sealing member SLM arranged in the peripheral region PFA shown in FIG. 1, and has a function of suppressing the leakage of the liquid crystal layer LQ to the outside of the display region DA. In order to improve the sealing performance of the sealing member SLM, it is preferable to increase the strength of each member arranged between the sealing member SLM and the substrate 10. In case with the formation of the through hole TH1 in the vicinity of the frame region FRA as seen in the display apparatus DSP1, the stress on each member in the frame region FRA is larger than that in a case without the through hole TH1, as described later in a modification example. Therefore, the strength of each member in the frame region FRA is preferably large.

In this case, in accordance with the material of the alignment film AL1, the alignment film AL1 has low bonding strength with the insulating film 16 that is a base film in some cases. In this case, when the transparent conductive film TCF2 is arranged between the alignment film AL1 and the insulating film 16, the bonding strength between the alignment film AL1 and the insulating film 16 is improved. Therefore, in order to improve the strength of the frame region FRA, it is preferable to arrange the transparent conductive film TCF2 in the frame region FRA.

Second Embodiment

In the first embodiment, the display apparatus DSP1 having the through hole TH1 formed in the transparent region TRA as shown in FIGS. 3 and 8 has been explained. In a second embodiment, a configuration example of a display apparatus not having the through hole TH1 in the transparent region TRA will be explained. In the present embodiment, while differences from the first embodiment will be mainly explained, the repetitive explanation for the same structures as those of the display apparatus DSP1 explained in the first embodiment will be omitted in principle. The explanation will be made with reference to the already-explained FIGS. 1 to 8 if needed.

FIG. 9 is an enlarged cross-sectional view of a display apparatus according to a modification example of the display apparatus shown in FIG. 3. FIG. 10 is an enlarged plan view showing a layout of a transparent conductive film arranged in a transparent region of the display apparatus shown in FIG. 9. FIG. 10 corresponds to FIG. 7. FIG. 11 is an enlarged cross-sectional view taken along a line A-A of FIG. 10.

The display apparatus DSP2 shown in FIG. 9 is different from the display apparatus DSP1 shown in FIG. 3 in that the through hole TH1 is not formed in the transparent region TRA. In the display apparatus DSP1, the visible-light transmittance of the transparent region TRA is achieved by, in the transparent region TRA, avoiding the arrangement of the transistor Tr1 of the plurality of subpixels PXs and the light-blocking members such as the light-blocking layer BM and the conductive layers CL1, CL2 and CL3 that are the metal-made conductive layers but arranging the visible-light transmittable member. Therefore, the transparent region TRA includes the substrate 10 and the substrate 20 facing each other and the liquid crystal layer LQ arranged between the substrate 10 and the substrate 20. The camera CAM is arranged so as to be close to the back surface of the substrate 10.

In the display apparatus DSP2, the through hole TH1 (see FIG. 3) is not formed in the transparent region TRA, and therefore, the strength of the periphery of the transparent region TRA is higher than that of the display apparatus DSP1 shown in FIG. 3. In the display apparatus DSP2, a member such as the insulating films 11, 12, 13, 14, 15 and 16 and the transparent conductive films TCF1 and TCF2 shown in FIG. 5 other than the substrate 10 and the substrate 20 can be arranged in the transparent region TRA as long as the member has the visible-light transmittance.

As shown in FIG. 10, the transparent conductive film TCF2 is arranged in the frame region FRA and the transparent region TRA in a planar view. The transparent conductive film TCF2 extends from the frame region FRA to the transparent region TRA. Each area of the plurality of transparent conductive films TCF2 in the frame region FRA and the transparent region TRA of the display apparatus DSP2 is larger than each area of the plurality of transparent conductive films TCF2 in the frame region FRA of the display apparatus DSP1 shown in FIG. 7. The electrical charge occurring due to the static electricity is easily trapped by the large area of the transparent conductive film TCF2, and therefore, the antistatic characteristics can be improved.

The transparent conductive film TCF2 in the frame region FRA and the transparent region TRA of the display apparatus DSP2 is divided into a plurality of portions, and the plurality of portions are connected to the different electrodes CE2. The electrode CE including the plurality of electrodes CE2 is an electrode that is electrically connected to the detection circuit DP as similar to the plurality of electrodes CE of the display apparatus DSP1 explained with reference to FIG. 6. Each of the plurality of electrodes CE is the transparent conductive film TCF1 formed in the conductive layer CL4 shown in FIG. 5.

When the transparent conductive film TCF2 can be arranged in the transparent region TRA as seen in the display apparatus DSP2, each area of the plurality of transparent conductive films TCF2 can be made large. In this case, an area ratio between a total of the area of the electrode CE2 and the area of the transparent conductive film TCF2 connected to the electrode CE2 and the area of the electrode CE3 can be adjusted so as to be substantially nearly regarded as 100%. In the display apparatus DSP2, the accuracy of the detection of the input position in the transparent region TRA and the peripheral region of the transparent region can be improved to be better than that of the display apparatus DSP1 shown in FIG. 7.

As shown in FIG. 11, in the display apparatus DSP2, the transparent conductive film TCF1 including the electrode CE is not arranged in the transparent region TRA. The electrode CE is not arranged in much of the frame region FRA. However, the electrode CE is arranged in the periphery of the boundary between the frame region FRA and the display region DA, and is electrically connected to the transparent conductive film TCF2 in the region in the periphery of this boundary. By the arrangement of the transparent conductive film TCF2 between the insulating film 16 and the alignment film AL1 as described above, the alignment film AL1 in the transparent region FRA is suppressed from being peeled off. The function of the antistatic film can be sufficiently obtained by the arrangement of the transparent conductive film TCF2 in the transparent region TRA. Therefore, in the display apparatus DSP2, the transparent conductive film TCF2 is arranged in place of transparent conductive film TCF1 in the transparent region TRA, so that the mechanical strength of the transparent region TRA is improved. As a modification example of the display apparatus DSP2, note that even the example of the arrangement of only the transparent conductive film TCF1 and the aspect of the arrangement of the transparent conductive films TCF1 and TCF2 in the transparent region TRA can prevent or suppress the electrical charge in the periphery of the transparent region.

As similar to the plurality of electrodes CE of the display apparatus DSP1 shown in FIG. 6, each of the plurality of electrodes CE of the display apparatus DSP2 shown in FIG. 10 functions as the common electrode to which the fixed potential is supplied in the display period. Therefore, even if the transparent conductive film TCF2 is electrically charged after the completion of the display apparatus DSP2, the electrical charge can be canceled by the supply of the fixed potential to the transparent conductive film TCF2.

The display apparatus DSP1 as shown in FIGS. 9 and 11 is different from the display apparatus DSP1 shown in FIG. 3 in that the liquid crystal layer LQ is arranged between the substrate 10 and the substrate 20 in the transparent region TRA. More specifically, as shown in FIG. 11, the alignment film AL1 and the alignment film AL2 are arranged between the substrate 10 and the substrate 20, and the liquid crystal layer LQ is arranged between the alignment film AL1 and the alignment film AL2. The alignment film AL1 covers the transparent conductive film TCF2 in the transparent region TRA and the frame region FRA. The liquid crystal molecules of the liquid crystal layer LQ are aligned in a mode of, for example, transmitting the light in a state without application of the electric field, that is so-called normally white mode. In this case, even if the transparent region TRA includes the liquid crystal layer LQ, the light transmittance can be secured.

Third Embodiment

A modification example of the display apparatus DSP2 explained in the second embodiment will be explained. FIG. 12 is an enlarged plan view showing a modification example of the display apparatus shown in FIG. 10. FIG. 13 is an enlarged cross-sectional view taken along a line A-A of FIG. 12. In the present embodiment, while differences from the second embodiment will be mainly explained, the repetitive explanation for the same structures as those of the display apparatus DSP1 explained in the first embodiment will be omitted in principle. The explanation will be made with reference to the already-explained FIGS. 1 to 11 if needed.

A display apparatus DSP3 shown in FIG. 12 is different from the display apparatus DSP1 shown in FIG. 10 in that single transparent conductive film TCF2 is arranged over the transparent region TRA and the frame region FRA. A shape of the transparent conductive film TCF2 included in the transparent region TRA and the frame region FRA of the display apparatus DSP3 is, for example, circle. However, the shape is only necessary to be along a planar shape of the transparent region TRA and a planar shape of the frame region FRA, and is not limited to the circle. In the example shown in FIG. 12, since the shape of the frame region FRA is a ring shape, the shape of the transparent conductive film TCF2 is the circle.

In the transparent region TRA of the display apparatus DSP2 shown in FIG. 10, a slit SLT is formed between the plurality of transparent conductive films TCF2. The slit SLT is a portion where the transparent conductive film TCF2 is not formed. The transparent conductive film TCF2 has the visible-light transmittance, and a portion where the transparent conductive film TCF2 is arranged and the slit SLT are different from each other in a refractive index for the visible light. Therefore, in order to reduce the refraction of the visible light in the transparent region TRA, it is preferable not to arrange the slit SLT in the transparent region TRA.

In the transparent conductive film TCF2 of the display apparatus DSP3 shown in FIG. 12, single transparent region TRA is formed so as to overlap the entire transparent region TRA. In this case, the slit SLT (see FIG. 10) is not formed in the transparent region TRA, and therefore, the visible-light transmittance of the transparent region TRA can be improved to be better than that of the display apparatus DSP2 shown in FIG. 10.

As shown in FIG. 13, the transparent conductive film TCF2 is electrically connected to the wiring MW3 arranged in the conductive layer CL3 through the contact hole CH1, the conductive pattern CP1 and the contact hole CH2 in the frame region FRA. More specifically, the conductive pattern CP1 formed in the conductive layer CL4 is formed in the frame region FRA. The conductive pattern CP1 is a pattern that is inserted in a passage electrically connecting the conductive layer CL5 and the conductive layer CL3, and is made of, for example, the transparent conductive film TCF1 as similar to the electrode CE. The insulating film 16 has a contact hole CH1 that is an opening at a position overlapping the conductive pattern CP1. The transparent conductive film TCF2 is buried in the contact hole CH1, and the conductive pattern CP1 and the transparent conductive film TCF2 are connected to each other at a base surface of the contact hole CH1. The insulating film 15 has a contact hole CH2 that is an opening at a position overlapping the conductive pattern CP1 and a wiring MW3. The conductive pattern CP1 is buried in the contact hole CH2, and the conductive pattern CP1 and the wiring MW3 are connected to each other at a base surface of the contact hole CH2.

As similar to the plurality of wirings MW3 of the display apparatus DSP1 explained with reference to FIG. 6, the wiring MW3 is electrically connected to any of the plurality of electrodes CE. Therefore, in the display period, a fixed potential is supplied to the transparent conductive film TCF2 shown in FIG. 13. Therefore, as similar to the display apparatus DSP1 shown in FIG. 7 and the display apparatus DSP2 shown in FIG. 10, even if the transparent conductive film TCF2 is electrically charged after the completion of the display apparatus DSP3, the electrical charge can be canceled by the supply of the fixed potential to the transparent conductive film TCF2.

A modification example of the display apparatus DSP3 is also considerable to have so-called floating conductive pattern in which the transparent conductive film TCF2 shown in FIG. 12 is not electrically connected to another conductive pattern. Even if the transparent conductive film TCF2 is in the floating state, the transparent conductive film TCF2 can be used as the antistatic film by a process of externally removing the electrical charge charged at the time of the process of manufacturing the display apparatus DSP1. In order to easily cancel the electrical charge, as seen in the display apparatus DSP3, it is preferable to connect the transparent conductive film TCF2 to the conductive pattern that is connected to outside of the display apparatus DSP3. After the completion, it is particularly preferable to connect the transparent conductive film TCF2 to a passage capable of supplying the fixed potential.

As shown in FIG. 12, the transparent conductive film TCF2 does not overlap the electrode CE2 arranged in the periphery of the transparent conductive film TCF2 in a planar view. And, the transparent conductive film TCF2 and the electrode CE2 are not electrically connected to each other. In this case, the transparent conductive film TCF2 does not contribute to the increase in the area of the electrode CE functioning as the detection electrode to stabilize the detection accuracy. Therefore, in terms of the stabilization of the detection accuracy, the display apparatus DSP1 shown in FIG. 7 and the display apparatus DSP2 shown in FIG. 10 are more preferable.

Fourth Embodiment

Next, a modification example resulted from combination of the display apparatus DSP1 explained in the first embodiment and the display apparatus DSP3 explained in the third embodiment will be explained. FIG. 14 is an enlarged plan view showing another modification example of the display apparatus shown in FIG. 7. FIG. 15 is an enlarged cross-sectional view taken along a line A-A of FIG. 14. In the present embodiment, while differences from the first and third embodiments will be mainly explained, the repetitive explanation for the same structures as those of the display apparatus DSP1 explained in the first embodiment will be omitted in principle. The explanation will be made with reference to the already-explained FIGS. 1 to 13 if needed.

A transparent conductive film TCF2 of a display apparatus DSP4 shown in FIG. 14 is different in that the transparent conductive film includes a plurality of portions FP1 arranged in the frame region FRA and a portion FP2 arranged in the transparent region TRA but being far from the plurality of portions FP1. The display apparatus DSP4 includes a transparent conductive film TCF2 that is divided into a plurality of pieces by the frame region FRA as similar to the display apparatus DSP1 shown in FIG. 7. In this manner, the detection accuracy in the case of the usage of the plurality of electrodes CE2 as the detection electrode is improved, and the antistatic characteristics of the transparent region TRA is improved.

As similar to the display apparatus DSP1 shown in FIG. 6, the plurality of electrodes CE that are connected to the detection circuit DP for use in the detection of the input position by using the change in the electrostatic capacitance are arranged in the display region DA of the display apparatus DSP4. As shown in FIG. 14, in a planar view, the plurality of electrodes CE include a plurality of electrodes CE2 that are arranged so as to be adjacent to the frame region FRA and an electrode CE3 that is far from the frame region FRA and that is not connected to the portion FP1 of the transparent conductive film TCF2 in the frame region FRA. The plurality of portions FP1 and the plurality of electrodes CE2 are electrically connected to each other, respectively. Note that the electrical connecting structure between the portion FP1 and the electrode CE2 is the same as the connecting structure between the transparent conductive film TCF2 and the electrode CE2 shown in FIG. 8, and therefore, its illustration is omitted. The portion FP2 is electrically insulated from the portion FP1, and is electrically connected to the electrode CE3 through the wiring MW3 shown with a dotted line in FIG. 14.

The electrical connection structure between the portion FP2 and the wiring MW3 is shown in FIG. 15. As shown in FIG. 15, the portion FP2 of the transparent conductive film TCF2 is electrically connected to the wiring MW3 arranged in the conductive layer CL3 through the contact hole CH1, the conductive pattern CP1 and the contact hole CH2 arranged in the frame region FRA. In the example shown in FIG. 15, note that the contact holes CH1 and CH2 overlap the image signal line SL and the scan signal line GL. In order to reduce the parasitic capacitance on these signal wirings, it is preferable not to arrange the contact holes CH1 and CH2 to overlap the image signal line SL and the scan signal line GL. For example, when a part of the portion FP1 shown in FIG. 14 is removed so that a distance of the extension wiring extending from the portion FP2 toward the display region DA increases, the positions of the contact holes CH1 and CH2 shown in FIG. 15 can be brought close to the boundary between the display region DA and the frame region FRA.

Fifth Embodiment

In the first embodiment, the aspect in the case of the total of the area of the electrode CE2 and the area of the transparent conductive film TCF2 connected to the electrode CE2 to be smaller than the area of the electrode CE3 has been explained as shown in FIG. 7. In the fifth embodiment, a modification example in the case of the total of the area of the electrode CE2 and the area of the transparent conductive film TCF2 connected to the electrode CE2 to be larger than the area of the electrode CE3 will be explained. In the present embodiment, while differences from the first and third embodiments will be mainly explained, the repetitive explanation for the same structures as those of the display apparatus DSP1 explained in the first embodiment will be omitted in principle. The explanation will be made with reference to the already-explained FIGS. 1 to 15 if needed.

FIG. 16 is an enlarged plan view of a display apparatus according to another modification example of the display apparatus shown in FIG. 7. FIG. 17 is an enlarged plan view of a display apparatus according to another modification example of the display apparatus shown in FIG. 12. The display apparatus DSP5 shown in FIG. 16 is different from the display apparatus DSP1 shown in FIG. 7 in shapes of the electrode CE2 and the transparent conductive film TCF2 connected to the electrode CE2. The display apparatus DSP6 shown in FIG. 17 is different from the display apparatus DSP3 shown in FIG. 12 in the shape of the electrode CE2.

Each electrode CE2 of the display apparatuses DSP5 and DSP6 is different from each electrode CE2 of the display apparatus DSP1 shown in FIG. 7 and the display apparatus DSP3 shown in FIG. 12 in that the area of the electrode CE2 adjacent to the frame region FRA is larger than the area of the electrode CE3 that is positioned to be far from the frame region FRA (in other words, there is a different electrode CE2 between the electrode CE2 and the frame region FRA). The electrode CE2 of the display apparatus DSP5 is structured so that the adjacent two electrodes CE2 of the four electrodes CE2 shown in FIG. 7 are uniformed. The electrode CE2 of the display apparatus DSP6 is structured so that the adjacent two electrodes CE2 of the four electrodes CE2 shown in FIG. 12 are uniformed.

The total of the area of the electrode CE2 and the area of the transparent conductive film TCF2 connected to the electrode CE2 is larger than the area of the electrode CE3. As described above, when the areas of the plurality of electrodes CE are different from one another, an area ratio of the other electrode CE to one electrode CE is preferably within 75% to 125%. The case of the area of the electrode CE2 to be smaller than the area of the electrode CE3 as seen in the display apparatus DSP1 in FIG. 7 or the case of the area of the electrode CE2 to be larger than the area of the electrode CE3 as seen in the display apparatus DSP5 in FIG. 8, whichever area ratio of the electrode CE2 and the electrode CE3 is closer to 100%, can be selected.

In the case of the display apparatus DSP6 shown in FIG. 17, the area of the electrode CE2 is larger than the area of the electrode CE3, and the electrode CE2 is not connected to the transparent conductive film TCF2 arranged in the transparent region TRA and the frame region FRA. This case can improve the visible-light transmittance of the transparent region TRA, and besides, improve the detection accuracy of the electrode CE2 functioning as the detection electrode. The transparent conductive film TCF2 that is arranged in the transparent region TRA and the frame region FRA in FIG. 17 functions as, for example, a shield electrode in the transparent region TRA to supply the common potential when being connected to a common-potential circuit CD, and does not need to function as the detection electrode.

It would be understood that various modification examples and alteration examples could have been anticipated within the concept of the present invention by those who are skilled in the art, and understood that these modification examples and alteration examples are also within the scope of the present invention. For example, the ones obtained by appropriate addition, removal, or design-change of the components to/from/into each of the above-described embodiments by those who are skilled in the art or obtained by addition, omitting, or condition-change of the step to/from/into each of the above-described embodiments are also within the scope of the present invention as long as they include the outline of the present invention.

INDUSTRIAL APPLICABILITY

The present invention can be utilized for a display apparatus.

EXPLANATION OF REFERENCE CHARACTERS 10, 20 . . . substrate
10f, 20f . . . front surface (plane, main surface)
20b . . . back surface (plane, main surface)
11 to 16 . . . insulating film
AL1, AL2 . . . alignment film
BL . . . backlight unit
BM . . . light-blocking film
CAM . . . camera
CD . . . common-potential supply circuit
CE, CE2, CE3 . . . electrode
CFB, CFG, CFR . . . color filter
CH1, CH2 . . . contact hole
CL1, CL2, CL3, CL4, CL5 . . . conductive layer
CP1 . . . conductive pattern
CS . . . capacitance element
CVM . . . cover member
DA . . . display region
DP . . . detection circuit
DSP1, DSP2, DSP3, DSP4, DSP5, DSP6 . . . display apparatus
FP1, FP2 . . . portion
FRA . . . frame region
GL . . . scan signal line
LQ . . . liquid crystal layer
MW3 . . . wiring
SL . . . image signal line
SLM . . . sealing member (adhesive member)
SLT . . . slit
TCF1, TCF2 . . . transparent conductive film
TH1 . . . through hole
TRA . . . transparent region

The invention claimed is:
1. A display apparatus comprising:
a first substrate and a second substrate arranged so as to face each other;
a display region included in each of the first substrate and the second substrate;
a transparent region formed inside the display region in a planar view;
a frame region formed between the display region and the transparent region so as to surround the transparent region along an outer edge of the transparent region in a planar view;
a polarizer formed in either the first substrate or the second substrate and having an opening overlapping the transparent region;
a first transparent conductive film formed in a first conductive layer between the first substrate and the second substrate; and
a second transparent conductive film formed in a second conductive layer between the first conductive layer and the second substrate,
wherein the first transparent conductive film or the second transparent conductive film is in the frame region in a planar view,
the second transparent conductive film is in the frame region, a plurality of first electrodes that are connected to a detection circuit detecting an input position by using change in an electrostatic capacitance are arranged in the display region, the second transparent conductive film in the frame region is electrically connected to a part of each of the plurality of first electrodes, each of the plurality of first electrodes is the first transparent conductive film formed in the first conductive layer, the second transparent conductive film in the frame region is divided into a plurality of portions, and the plurality of portions are connected to different first electrodes, respectively, and the plurality of first electrodes include a second electrode that is connected to the second transparent conductive film in the frame region and a third electrode that is at a position far from the frame region and that is not connected to the second transparent conductive film in the frame region.

2. The display apparatus according to claim 1, wherein a through hole penetrating the first substrate and the second substrate is formed in the transparent region, and a sealing member surrounding the through hole is arranged between the first substrate and the second substrate in the frame region.

3. The display apparatus according to claim 1, wherein the second transparent conductive film is in the frame region and the transparent region in a planar view.

4. The display apparatus according to claim 3, wherein a fixed potential is supplied to the second transparent conductive film in frame region and the transparent region.

5. A display apparatus comprising:
a first substrate and a second substrate arranged so as to face each other;
a display region included in each of the first substrate and the second substrate;
a transparent region formed inside the display region in a planar view;
a frame region formed between the display region and the transparent region so as to surround the transparent region along an outer edge of the transparent region in a planar view;
a polarizer formed in either the first substrate or the second substrate and having an opening overlapping the transparent region;
a first transparent conductive film formed in a first conductive layer between the first substrate and the second substrate; and
a second transparent conductive film formed in a second conductive layer between the first conductive layer and the second substrate,
wherein the first transparent conductive film or the second transparent conductive film is in the frame region in a planar view,
a fixed potential is supplied to the second transparent conductive film in the frame region and the transparent region, and
the first transparent conductive film is not arranged in the transparent region.

6. A display apparatus comprising:
a first substrate and a second substrate arranged so as to face each other;
a display region included in each of the first substrate and the second substrate;
a transparent region formed inside the display region in a planar view;
a frame region formed between the display region and the transparent region so as to surround the transparent region along an outer edge of the transparent region in a planar view;
a polarizer formed in either the first substrate or the second substrate and having an opening overlapping the transparent region;
a first transparent conductive film formed in a first conductive layer between the first substrate and the second substrate; and
a second transparent conductive film formed in a second conductive layer between the first conductive layer and the second substrate,
wherein the first transparent conductive film or the second transparent conductive film is in the frame region in a planar view,
the second transparent conductive film is in the frame region and the transparent region in a planar view,
a fixed potential is supplied to the second transparent conductive film in the frame region and the transparent region,
wherein the second transparent conductive film includes:
a plurality of first portions arranged in the frame region; and
a second portion arranged in the transparent region and being far from the plurality of first portions,
a plurality of first electrodes that are connected to a detection circuit detecting an input position by using change in an electrostatic capacitance are arranged in the display region,
the plurality of first electrodes include a plurality of second electrodes that are adjacent to the frame region in a planar view and a third electrode that is at a position far from the frame region and that is not connected to the first portion of the second transparent conductive film in the frame region,
the plurality of first portions and the plurality of second electrodes are electrically connected to each other, and
the second portion is electrically insulated from the first portion, and is electrically connected to the third electrode.

7. The display apparatus according to claim 3, A display apparatus comprising:
a first substrate and a second substrate arranged so as to face each other;
a display region included in each of the first substrate and the second substrate,
a transparent region formed inside the display region in a planar view,
a frame region formed between the display region and the transparent region so as to surround the transparent region along an outer edge of the transparent region in a planar view;
a polarizer formed in either the first substrate or the second substrate and having an opening overlapping the transparent region;
a first transparent conductive film formed in a first conductive layer between the first substrate and the second substrate; and
a second transparent conductive film formed in a second conductive layer between the first conductive layer and the second substrate, wherein the first transparent conductive film or the second transparent conductive film is in the frame region in a planar view, the second transparent conductive film is in the frame region and the transparent region in a planar view, a plurality of first electrodes that are connected to a detection circuit detecting an input position by using change in an electrostatic capacitance are arranged in the display region, and the second transparent conductive film in the frame region is electrically connected to a part of each of the plurality of first electrodes.

8. The display apparatus according to claim 7, wherein each of the plurality of first electrodes is the first transparent conductive film formed in the first conductive layer.

9. The display apparatus according to claim 8, wherein the second transparent conductive film in the frame region and the transparent region are divided into a plurality of portions, and the plurality of portions are connected to different first electrodes, respectively.

10. The display apparatus according to claim 9, wherein the plurality of first electrodes include a second electrode that is connected to the second transparent conductive film in the frame region and the transparent region and a third electrode that is at a position far from the frame region and that is not connected to the second transparent conductive film in the frame region and the transparent region.

11. The display apparatus according to claim 5, wherein the second transparent conductive film includes:
a plurality of first portions arranged in the frame region; and
a second portion arranged in the transparent region and being far from the plurality of first portions, a plurality of first electrodes that are connected to a detection circuit detecting an input position by using change in an electrostatic capacitance are arranged in the display region, the plurality of first electrodes include a plurality of second electrodes that are adjacent to the frame region in a planar view and a third electrode that is at a position far from the frame region and that is not connected to the first portion of the second transparent conductive film in the frame region, the plurality of first portions and the plurality of second electrodes are electrically connected to each other, and the second portion is electrically insulated from the first portion, and is electrically connected to the third electrode.

* * * * *